United States Patent
Keshavmurthy et al.

(10) Patent No.: US 9,170,097 B2
(45) Date of Patent: Oct. 27, 2015

(54) HYBRID SYSTEM

(75) Inventors: Shyam P. Keshavmurthy, Ann Arbor, MI (US); Chengchih Lin, Ann Arbor, MI (US); David T. Wegryn, Ann Arbor, MI (US)

(73) Assignee: Perceptron, Inc., Plymouth, MI (US)

(*) Notice: Subject to any disclaimer, the term of this patent is extended or adjusted under 35 U.S.C. 154(b) by 497 days.

(21) Appl. No.: 13/492,065

(22) Filed: Jun. 8, 2012

(65) Prior Publication Data

US 2012/0307260 A1    Dec. 6, 2012

Related U.S. Application Data

(63) Continuation-in-part of application No. 13/205,160, filed on Aug. 8, 2011, which is a continuation-in-part of application No. 12/416,463, filed on Apr. 1, 2009, now Pat. No. 8,014,002.

(60) Provisional application No. 61/072,607, filed on Apr. 1, 2008.

(51) Int. Cl.
   *G01B 11/02* (2006.01)
   *G01B 11/25* (2006.01)
   *G01B 11/24* (2006.01)

(52) U.S. Cl.
   CPC ........ *G01B 11/2509* (2013.01); *G01B 11/2441* (2013.01); *G01B 11/2513* (2013.01); *G01B 11/2518* (2013.01)

(58) Field of Classification Search
   CPC ........... G01B 11/2509; G01B 11/2513; G01B 11/2518; G01B 11/2441; G01B 11/25; G01B 11/255
   USPC ......................................................... 356/511
   See application file for complete search history.

(56) References Cited

U.S. PATENT DOCUMENTS

| 4,070,683 | A | * | 1/1978 | Altschuler et al. ............ 396/431 |
| 5,028,799 | A |   | 7/1991 | Chen et al. |
| 6,049,389 | A |   | 4/2000 | Volay et al. |
| 6,078,396 | A | * | 6/2000 | Manzouri ...................... 356/496 |

(Continued)

FOREIGN PATENT DOCUMENTS

| EP | 2 295 932 A1 | 3/2011 |
| JP | 2002236264 | 8/2002 |

(Continued)

OTHER PUBLICATIONS

Thomas P. Koninckx and Luc Van Gool, "Real-Time Range Acquisition by Adaptive Structured Light", IEEE Transactions on Pattern Analysis and Machine Intelligence, vol. 29, No. 3, Mar. 2006.

(Continued)

*Primary Examiner* — Tarifur Chowdhury
*Assistant Examiner* — Jonathon Cook
(74) *Attorney, Agent, or Firm* — Brinks Gilson & Lione

(57) ABSTRACT

A system and method is provided for imaging an article within a field of view, projecting an illumination field onto the article within field of view, and selectively projecting illumination structures onto the article within the field of view. Then, image data corresponding to the illumination field and the illumination structures may be received and a feature of the article may be analyzed based on the illumination field and the illumination structures.

22 Claims, 23 Drawing Sheets

(56) References Cited

U.S. PATENT DOCUMENTS

| | | | |
|---|---|---|---|
| 6,262,803 B1* | 7/2001 | Hallerman et al. | 356/603 |
| 6,473,167 B1 | 10/2002 | Odell | |
| 6,564,166 B1* | 5/2003 | Ume et al. | 702/136 |
| 6,624,899 B1 | 9/2003 | Clark | |
| 6,733,135 B2 | 5/2004 | Dho | |
| 6,910,776 B2 | 6/2005 | Dho et al. | |
| 7,023,559 B1* | 4/2006 | Coulombe et al. | 356/511 |
| 7,029,126 B2 | 4/2006 | Tank | |
| 7,214,926 B2 | 5/2007 | Gruhlke et al. | |
| 7,252,394 B1 | 8/2007 | Fu | |
| 7,277,173 B1 | 10/2007 | Bock et al. | |
| 7,346,234 B2 | 3/2008 | Davis et al. | |
| 7,399,104 B2 | 7/2008 | Rappaport | |
| 7,454,841 B2* | 11/2008 | Burns et al. | 33/288 |
| 2002/0105653 A1 | 8/2002 | Pezeshki | |
| 2002/0180988 A1 | 12/2002 | Johnston et al. | |
| 2003/0011751 A1 | 1/2003 | Sakata et al. | |
| 2004/0105580 A1 | 6/2004 | Hager et al. | |
| 2005/0052635 A1 | 3/2005 | Xie et al. | |
| 2005/0146764 A1 | 7/2005 | Deng et al. | |
| 2006/0139714 A1 | 6/2006 | Gruhike et al. | |
| 2006/0158662 A1 | 7/2006 | Schelinski et al. | |
| 2006/0215176 A1* | 9/2006 | Van Coppenolle et al. | 356/603 |
| 2006/0269896 A1 | 11/2006 | Liu et al. | |
| 2006/0291063 A1 | 12/2006 | Takemoto | |
| 2007/0070046 A1 | 3/2007 | Sheynblat et al. | |
| 2007/0124949 A1* | 6/2007 | Burns et al. | 33/288 |
| 2008/0037090 A1 | 2/2008 | Miller et al. | |
| 2008/0049101 A1 | 2/2008 | Yamazaki | |
| 2008/0073484 A1 | 3/2008 | Kane | |
| 2008/0278729 A1* | 11/2008 | Kim | 356/450 |
| 2009/0262363 A1 | 10/2009 | Keshavmurthy et al. | |
| 2009/0268212 A1 | 10/2009 | Ko et al. | |
| 2010/0007896 A1 | 1/2010 | Fishbaine | |

FOREIGN PATENT DOCUMENTS

| | | |
|---|---|---|
| JP | 2004085596 | 3/2004 |
| JP | 2006189573 | 7/2006 |
| JP | 2006343397 | 12/2006 |
| JP | 2008241643 | 10/2008 |
| JP | 2008256465 | 10/2008 |
| WO | WO 2006-076731 | 7/2006 |
| WO | WO 2011/070313 A1 | 6/2011 |

OTHER PUBLICATIONS

German Office Action, Application No. 10 2013 105 828.0, Dated Jul. 29, 2014.

* cited by examiner

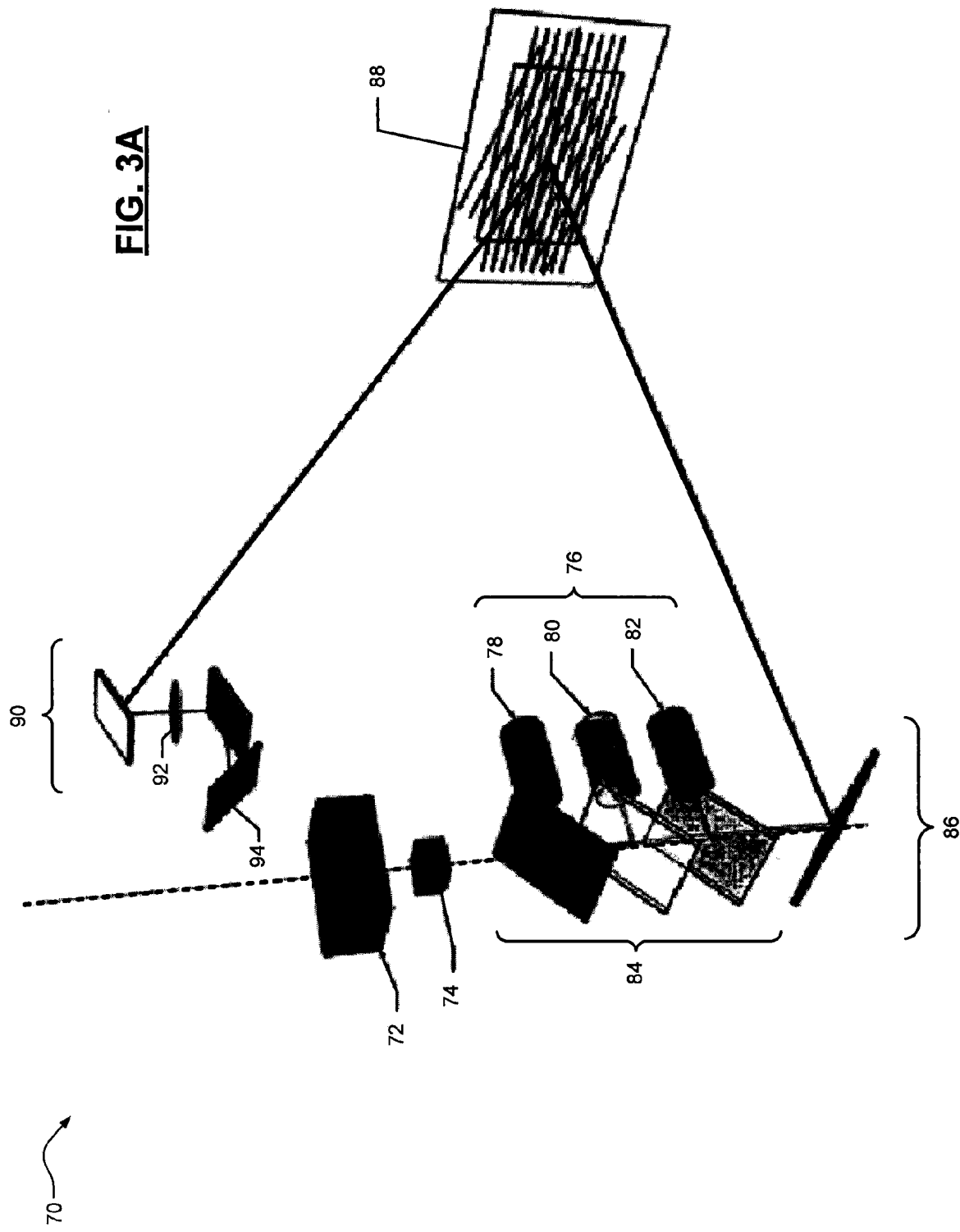

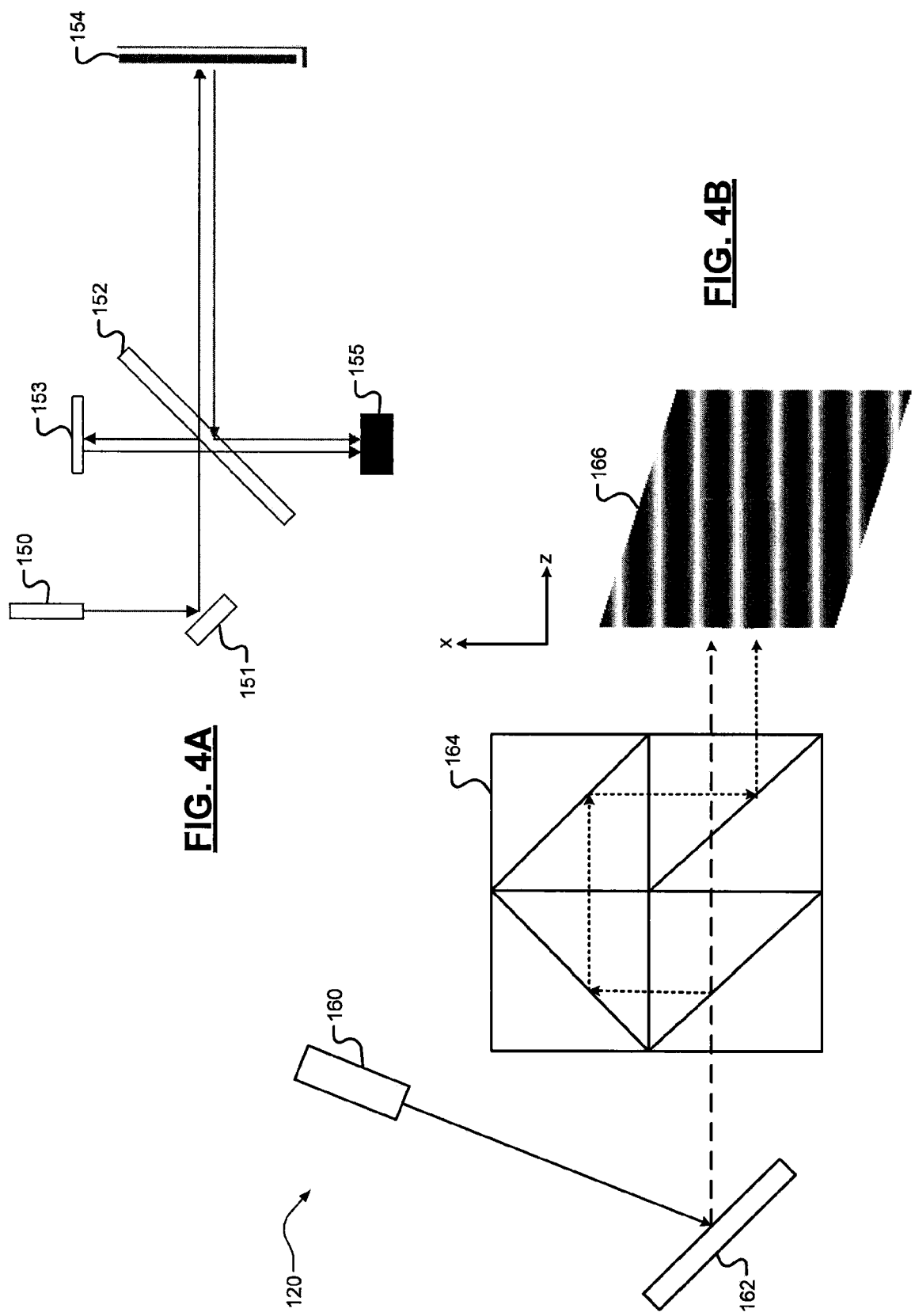

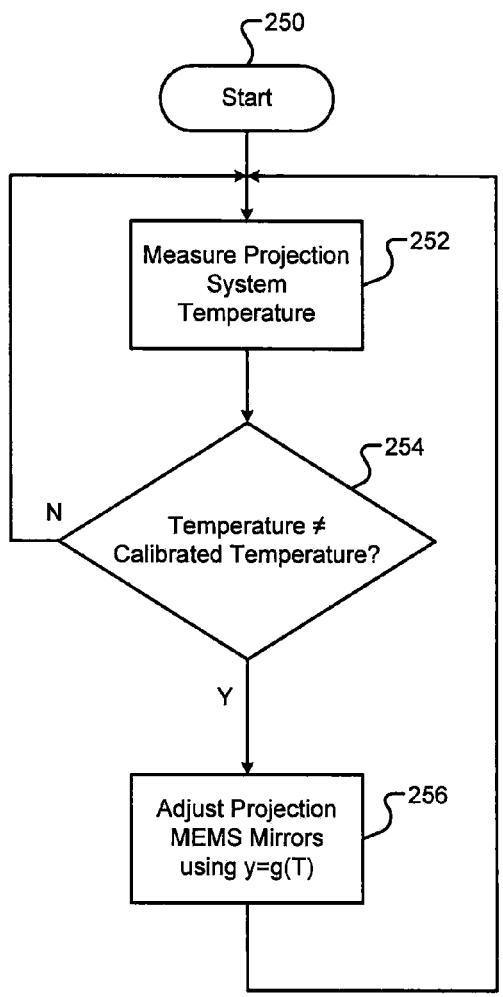 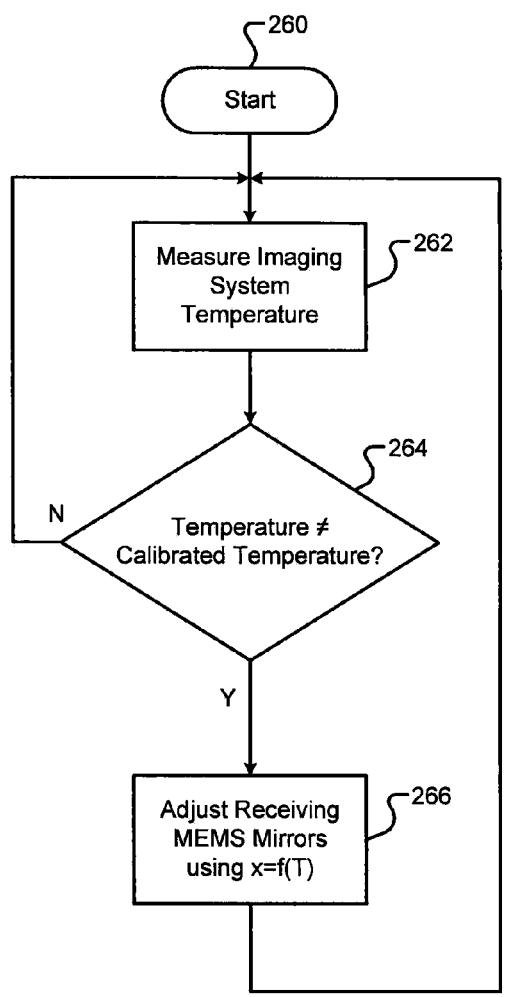
FIG. 8A　　　　FIG. 8B

HYBRID SYSTEM

CROSS-REFERENCE TO RELATED APPLICATIONS

This application is a continuation-in-part of U.S. patent application Ser. No. 13/205,160, filed on Aug. 8, 2011, which is a continuation-in-part of U.S. patent application Ser. No. 12/416,463, filed on Apr. 1, 2009, and claims the benefit of U.S. Provisional Application No. 61/072,607, filed on Apr. 1, 2008. The disclosures of the above applications are incorporated herein by reference in their entirety.

BACKGROUND

1. Field of the Invention

The present disclosure relates to laser projection systems and more particularly to systems and methods for utilizing a field projection system and an adaptive light device.

2. Description of Related Art

Structured light is the process of projecting a known pattern of pixels (e.g. grids or horizontal bars) onto a surface. Deformation of the known pattern when striking the surface allows sensor systems to determine contour of the surface (e.g. range or distance of features). For example, structured light may be used in structured light three-dimensional (3D) scanners.

Referring now to FIG. 1, a light detection and ranging (LIDAR) scanning system 10 according to the prior art is shown. The LIDAR system 10 measures the contour of a surface 16. The system 10 includes an infrared (IR) source 12, a steering mirror 14, a receiving mirror 18, and an IR receiver 20.

The IR source 12 generates a beam of IR light that is projected onto the surface 16 by the steering mirror 14. IR light that is reflected off of the surface 16 is directed by the receiving mirror 18 to the IR receiver 20. The IR receiver 20 may then generate a grey-mapping corresponding to a contour of the surface 16 based on phase differences between the projected IR light and the received IR light.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

A system and method is provided for imaging an article within a field of view, projecting an illumination field onto the article within field of view, and selectively projecting illumination structures onto the article within the field of view. Then, image data corresponding to the illumination field and the illumination structures may be received and a feature of the article may be analyzed based on the illumination field and the illumination structures.

A structured light sensor system for measuring contour of a surface includes a projection system, an imaging system, and a control module. The projection system is configured to project onto the surface either (i) a point of light, (ii) a first plurality of points of light forming a line of light, or (iii) a second plurality of points of light forming a plurality of lines of light. The imaging system is configured to selectively capture an image of the surface, wherein the image of the surface is based on light reflected off the surface. The control module is configured to coordinate control of both the projection system and the imaging system to operate the structured light sensor system in each of: (i) a point mode, during which the projection system projects the point of light during a first period and the imaging system is on for the first period, (ii) a line mode, wherein the projection system projects the first plurality of points of light during a second period and the imaging system is on for the second period, and (iii) an area mode, wherein the projection system projects the second plurality of points of light during a third period and the imaging system is on for the third period.

A structured light sensor system for measuring a parameter of a feature on a surface includes a projection system, an imaging system, and a control module. The projection system is configured to project a first pattern of light onto the surface, the projection system including a light system having a plurality of light sources, an optics system, and a set of micro electro-mechanical system (MEMS) mirrors. The imaging system is configured to selectively capture an image of the surface, the image including light reflected off of the surface that is indicative of the parameter of the feature. The control module is configured to: (i) generate data corresponding to the captured image, (ii) process the generated data to determine the parameter of the feature, and (iii) control the projection system to project a second pattern of light onto the surface, the second pattern of light displaying the determined parameter of the feature to a user.

A device for measuring contour of a surface includes a housing, an imaging lens system within the housing, an image capturing device within the housing, a set of micro electro-mechanical system (MEMS) mirrors within the housing, and a control module within the housing. The imaging lens system is configured to focus light reflected from the surface using at least one lens, wherein the imaging lens system has a corresponding lens plane of focus, and wherein the light reflected from the surface is indicative of the contour of the surface. The image capturing device is configured to capture the focused light and to generate data corresponding to the captured light, wherein the image capturing device has a corresponding image plane of focus, and wherein the image plane of focus is not parallel to the lens plane of focus. The set of micro MEMS mirrors are configured to direct the focused light to the image capturing device. The control module is configured to receive the data from the image capturing device corresponding to the captured light, to determine a quality of focus of the captured light based on the received data, and to control the set of MEMS mirrors based on the quality of focus to maintain a Scheimpflug tilt condition between the lens plane of focus and the image plane of focus.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A is a schematic of a first exemplary structured light contour sensing system according to the present disclosure;

FIGS. 4A-4B are schematics illustrating an exemplary interferometer according to the prior art and an exemplary interferometry system of the structured light contour sensing system according to the present disclosure, respectively;

FIGS. 8A-8B are flow diagrams of exemplary methods of compensating for temperature variations of the structured light contour sensing system according to the present disclosure;

DETAILED DESCRIPTION

Figure 1:
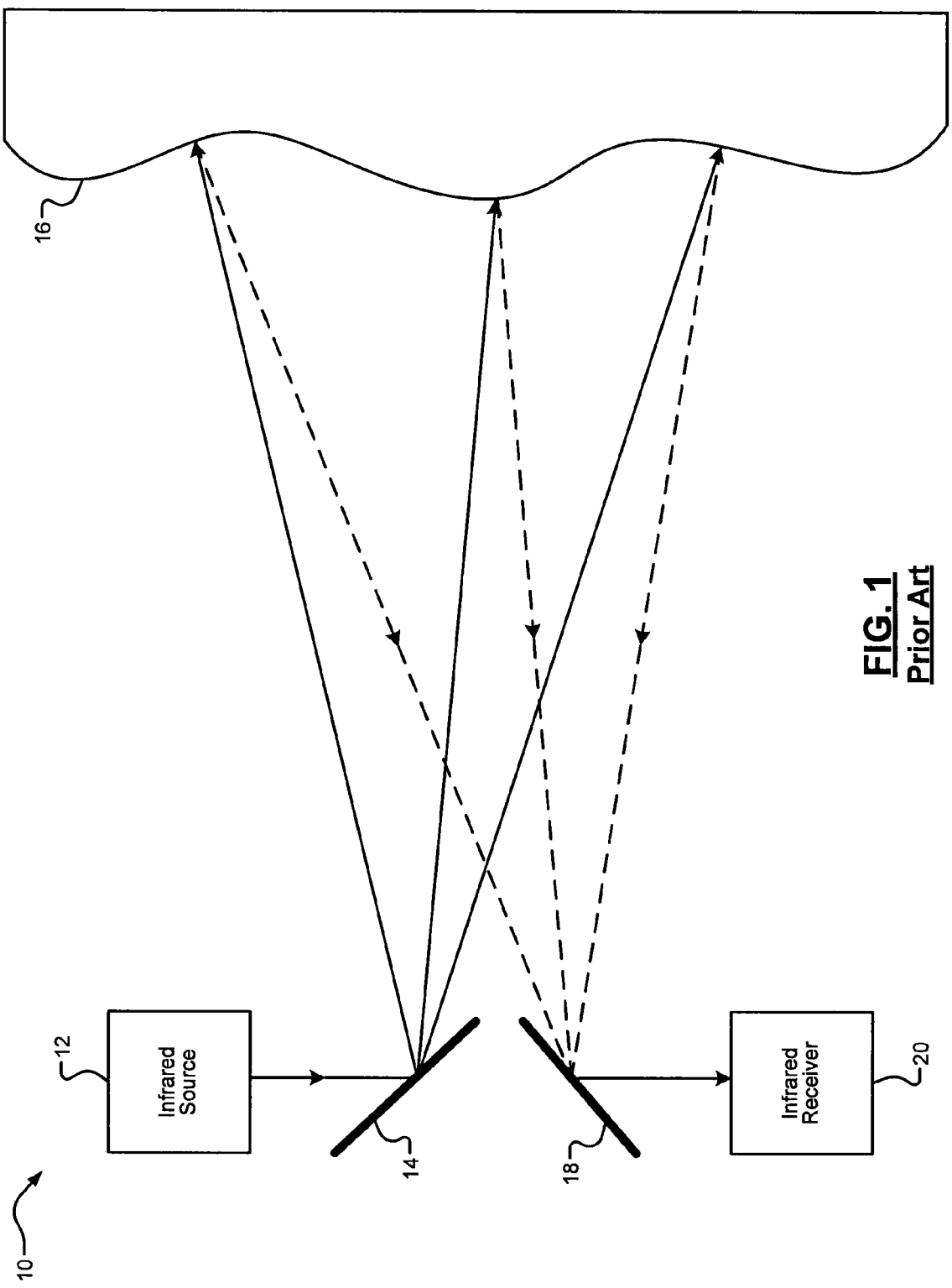
FIG. 1 is a schematic of a LIDAR scanning system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Conventional structured light sensing systems have a limited depth of field. In other words, conventional structured light sensing systems may not sense particular contours of a surface due to the limited sensing depth. A Scheimpflug tilt condition may be implemented to increase depth of field. However, a Scheimpflug tilt condition has not been implemented in structured light sensing systems (i.e. metrology) due to limitations in focus of the line array over the entire depth of field of the sensing system.

Figure 2:
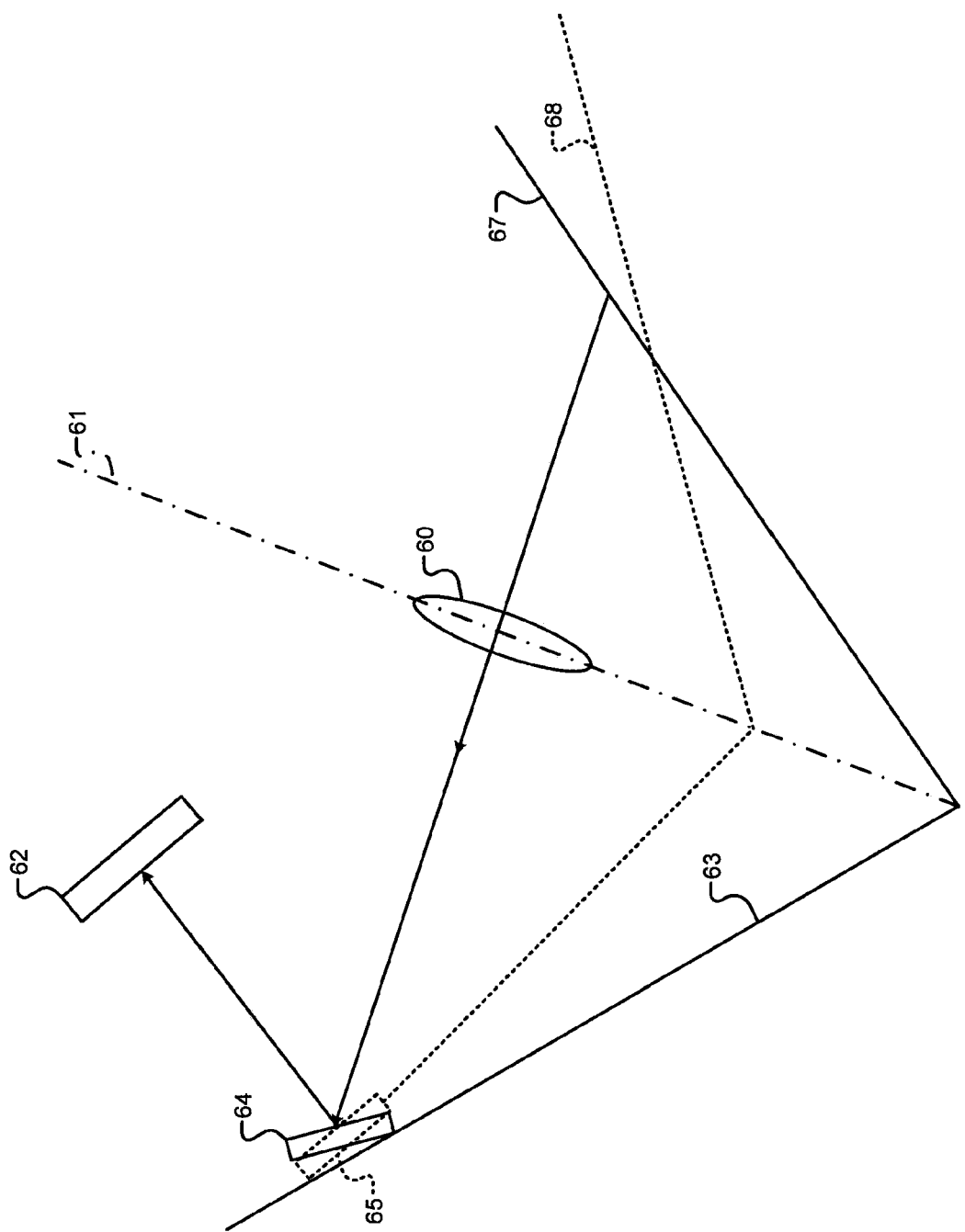
FIG. 2 is a schematic illustrating a Scheimpflug tilt condition between a lens plane and an imaging plane according to the present disclosure.

Referring now to FIG. 2, the Scheimpflug principle is illustrated. The Scheimpflug principle is a geometric rule that describes the orientation of a plane of sharp focus 66 of an optical system (lens 60 and imager 62) when a lens plane 61 is not parallel to an image plane 63. The image plane 63 corresponds to a micro electro-mechanical system (MEMS) mirror 64 that is reflecting light from the lens 60 onto the imager 62.

In other words, when an oblique tangent is extended from the image plane 63, and another is extended from the lens plane 61, they meet at a line through which a plane of sharp focus 66 also passes. For example, with this condition, a planar subject that is not parallel to the image plane can be completely in focus. Therefore, the MEMS mirror 64 may be adjusted to maintain a focus condition on the imager 62. For example, the MEMS mirror 64 may be adjusted to a different angle (represented by MEMS mirror 65) to compensate for a different plane of sharp focus 67.

Therefore, systems and methods for structured light contour sensing that incorporate a multi-pixel MEMS mirror array in the optical receive path to maintain a Scheimpflug tilt condition are presented. The systems and methods of the present disclosure allow for each line to be directed onto the imager in a focused condition as they are projected in real time by the projector system. Thus, a smaller focal length imaging lens with a larger aperture may be used, thereby increasing the optical signal and allowing for more accurate metrology.

Furthermore, conventional structured light sensing systems do not generate three-dimensional (3D) data for feature extraction and/or form measurement of surface contour. In other words, conventional structured light sensing systems merely generate a two-dimensional (2D) pattern for comparison to an original projected 2D pattern.

Therefore, systems and methods for structured light contour sensing that incorporate 3D data generation, feature extraction, and/or form measurement are presented. The systems and methods of the present disclosure generate 3D point clouds that may be used for feature extraction/tracking and/or form measurement. In other words, the systems and methods of the present disclosure allow for more accurate metrology, particularly in the z-direction (i.e. contour depth). Additionally, the 3D point clouds may be output to external software for additional modeling and/or processing.

Referring now to FIG. 3A, a first exemplary embodiment of the structured light contour sensing system 70 according to the present disclosure is shown. The structured light contour sensing system 70 determines contour of a surface 88. The structured light contour sensing system 70 may further include the control module 72, an accelerometer 74, a light system 76, a first MEMS mirror system 86, a second MEMS mirror system 90, a focusing lens system 92, and an imager 94.

The light system 76 includes first, second, and third light sources 78, 80, and 82. In one embodiment the first, second, and third light sources 78, 80, 82 are lasers. However, it can be appreciated that other light sources may be implemented. For example, the first, second, and third light sources 78, 80, 82 may each produce light having a different wavelength. In one embodiment, these wavelengths may correspond to the colors red, green, and blue. However, it can be appreciated that different colors (i.e. different wavelength ranges) may be implemented.

The first, second, and third light sources 78, 80, 82 may be combined into one coaxial beam of light. The light system 76 may further include an optics system 84 that generates a pattern of light using the first, second, and third light sources 78, 80, 82. For example, in one embodiment the optics system 84 may include holographic diffraction elements, beam splitters, and/or prisms. However, it can be appreciated that the optics system 84 may include other optical elements. The elements in the optical system 84 manipulate the light (offsetting, splitting, diffracting, etc.) to achieve the desired pattern of light.

Additionally, it can be appreciated that the structured light contour sensing system 70 may include an additional light system (not shown) and a phase shifting system (not shown) for performing interferometry on the surface 88. More specifically, the structured light contour sensing system 70 may switch between projecting a pattern of light for feature extraction and/or form measurement purposes and projecting fringed lines of light for flatness measurement (i.e. interferometry).

As shown, for feature extraction and/or form measurement purposes, the contour sensing system 70 projects a first pattern of light onto the surface 88 and then focuses and captures a second pattern of light that is reflected from the surface 88. The second pattern of light is indicative of the contour of the surface 88. The contour sensing system 70 may then compare the focused second pattern of light that has been captured to the first pattern of light projected onto the surface. More specifically, the control module 72 may determine differences between an expected first pattern of light and the focused second pattern of light that is reflected from the surface 88. For example, the control module 72 may determine phase differences between the second pattern of light and the first pattern of light. These differences correspond to features of the surface 88, and collectively define a contour of the surface.

These features may be output to external systems for additional processing, or may be stored and/or tracked by the control module 72. In other words, the control module 72 may continuously control projection of the first pattern of light onto the surface 88 based on the focused second pattern of light reflected from the surface (i.e., feedback) to refine measurement of specific features that collectively make up the contour of the surface 88. In other words, the control module 72 may project a third pattern of light that is different than the first pattern of light. For example, the control module 12 may include a datastore that stores data corresponding to a plurality of different patterns of light (i.e., calibration data).

Figure 3B:
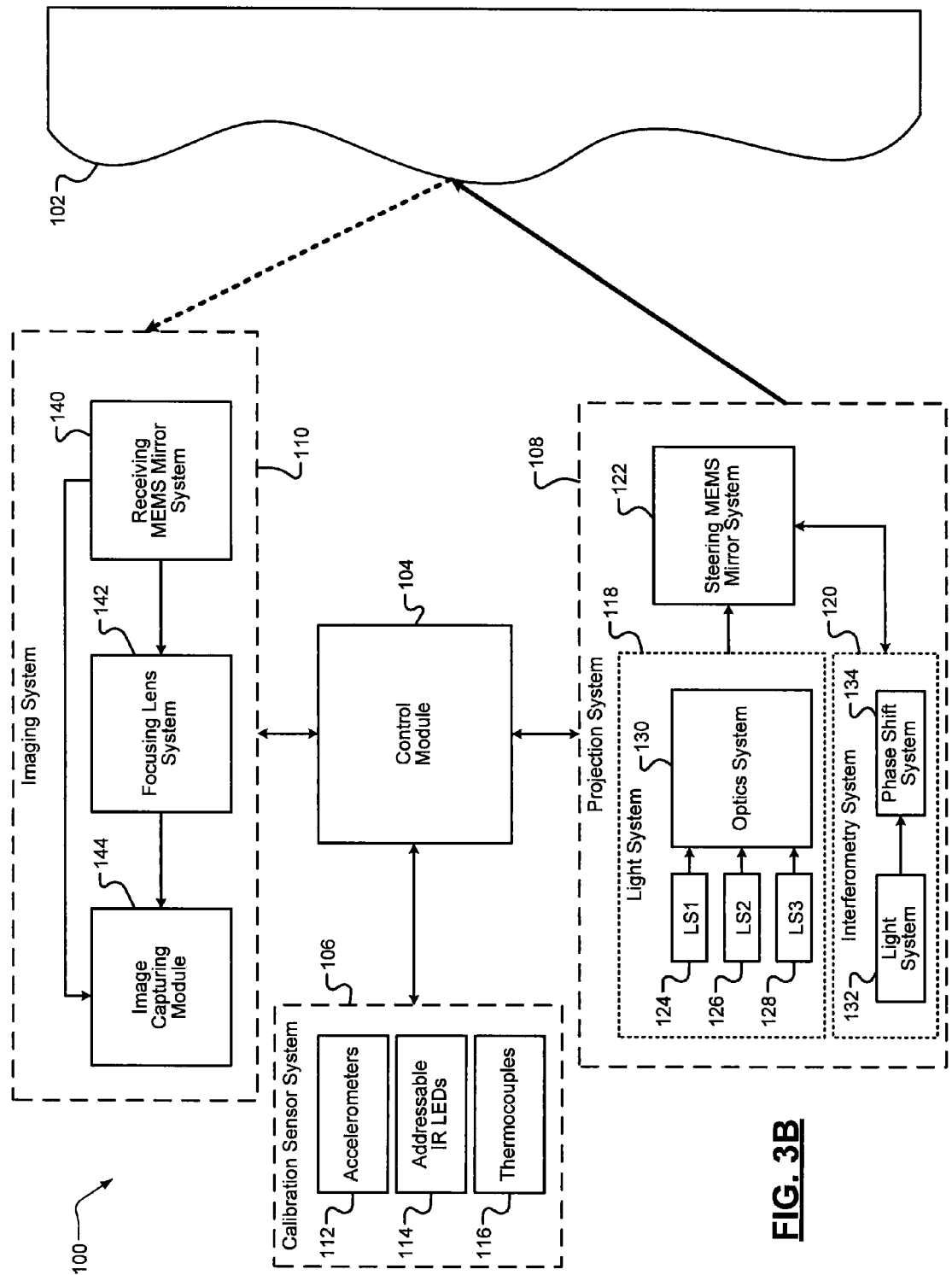
FIG. 3B is a functional block diagram of a second exemplary structured light contour sensing system according to the present disclosure.

Referring now to FIG. 3B, a second exemplary embodiment of the structured light contour sensing system 100 of the present disclosure is shown. The system 100 determines a contour of a surface 102. The system 100 includes a control module 104, a calibration sensor system 106, a projection system 108, and an imaging system 110.

The calibration sensor system 106 determines various calibration parameters, such as orientation of the system 100, global positioning of the system 100, and temperature of the system 100. Sensing orientation and global positioning of the system 100 may allow the control module 104 to reduce setup time of the system 100 and to increase setup accuracies in fixed installations. Additionally, sensing temperature of the system 100 may allow the control module 104 to automatically compensate for temperature variations.

In one embodiment, the calibration sensor system 106 includes an accelerometer 112, a plurality of addressable IR light emitting diodes (LEDs) 114, and a thermocouple 116. For example, the accelerometer 112 may be a solid state accelerometer that provides orientation of the system 100 via measurement of tilt of the system 100 relative to two axes. For example, the IR LEDs 114 may be located at predetermined positions on the system 100 and thus may be used to determine and calibrate position of the system 100 in an external coordinate space (i.e. a system including a plurality of different sensors). For example only, the IR LEDs 114 may allow for position determination and calibration via a commercially stereographic measurement device. Additionally, for example, the thermocouple 116 may provide temperature information to allow the system 100 to automatically compensate for temperature variations.

The projection system 108 projects either a first pattern of light or fringed lines of light onto the surface 102 based on commands from the control module 104 (i.e. depending on whether extracting features, measuring formations, or performing interferometry). The projection system 108 may project individual beams of light onto the surface 102 or the projection system 108 may combine multiple beams of light into a coaxial beam of light to project onto the surface 102. In one embodiment the multiple beams of light are produced by lasers. The projection system 108 may also control color, intensity, and pattern of the first pattern of light projected onto the surface 102.

In one embodiment, the projection system 108 includes a light system 118, an interferometry system 120, and a steering MEMS mirror system 122. Light system 118 may be used for generating a pattern of light for projection onto the surface 102 for feature extraction and/or form measurement by the control module 104. The interferometry system 120 may be used as for interferometry of the surface 102. More specifically, the interferometry system 120 may be used for generating fringed lines of light on the surface 102 for determination of flatness of the surface.

For example, light system 118 may further include a first light source (LS1) 124, a second light source (LS2) 126, and a third light source (LS3) 128. Alternatively, it can be appreciated the light system 118 may include fewer or more light sources than shown (e.g. one single light source). Furthermore, the light sources 124, 126, 128 may be combined into a single coaxial beam of light. For example, the light sources 124, 126, 128 may be amplitude modulated light sources, pulse frequency modulated light sources, and/or wavelength modulated light sources. Additionally, the light sources 124, 126, and 128 may be wavelength dithered in real time to reduce speckle effects when projected onto the surface 102.

For example, in one embodiment, LS1 124 may be a red laser, LS2 126 may be a green laser, and LS3 may be a blue laser 128. More specifically, the red laser 124 may generate a laser beam with a wavelength corresponding to red light (e.g., 600 to 690 nm). The green laser 126 may generate a laser beam with a wavelength corresponding to green light (e.g., 520 to 600 nm). The blue laser 128 may generate a laser beam with a wavelength corresponding to blue light (e.g. 450 to 520 nm). However, it can be appreciated that the light sources 124, 126, 128 may produce different colored light (i.e. different wavelength ranges).

Additionally, the light system 118 may include an optics system 130 to create a pattern of light using the light sources 124, 126, 128. For example, the optics system 130 may generate a pattern using holographic diffraction elements, electro-optical elements, and/or beam splitters. Additionally, for example, the optics system 130 may include narrow bandpass filters, mirrors, and/or prisms.

In one embodiment, the single (e.g. coaxial) beam of light generated by the light system 118 may be a flying spot raster. In other words, the coaxial beam may include individual red, green, and blue components. Thus, the control module 104 may control intensity and/or color of the coaxial beam of light by controlling intensities of the light sources 124, 126, 128 of the light system 118. For example, the control module 104 may control the intensity and/or color of the coaxial beam of light due to a distance from the surface 102 or a color of the surface 102, respectively.

More specifically, in one embodiment the control module 104 may control a color of the coaxial beam of light based on feedback to match the color of the surface 102. Adjusting the color of the projected light to match the color of the surface 102 may increase accuracy (i.e. resolution) of the system. Thus, the control module 104 may control the three light sources 124, 126, 128 to control the color of the coaxial beam of light. For example, the control module 104 may increase the intensity of light source 122 (where light source 122 produces light having a wavelength corresponding to red light) in order to increase a red level of the coaxial beam of light. Thus, the control module 104 may control the resulting color of the coaxial beam of light projected onto the surface 102 based on feedback via the captured light (reflected off of surface 102).

While the light system 118 may generate a coaxial beam of light, it can be appreciated that the light system 118 may also produce a plurality of beams of light that are each projected onto the surface 102 using a subset of MEMS mirrors from the steering MEMS mirror system 122. More specifically, in one embodiment beam of light from LS1 124 may be projected onto the surface 102 using a first set of MEMS mirrors from the steering MEMS mirror system 122. For example, the beam of light from LS2 126 may be projected onto the surface 102 using a second set of MEMS mirror from the steering MEMS mirror system 122. Additionally, for example, the beam of light from LS3 128 may be projected onto the surface 102 using a third set of MEMS mirrors from the steering MEMS mirror system 122.

Alternatively, the structured light contour sensing system 100 may perform interferometry of the surface 102 using the interferometry system 120. More specifically, a light system 132 (different than light system 118) may generate a beam of light that is phase shifted by the phase shifting system 134, and both the original beam of light and the phase shifted beam of light may projected onto the surface 102 via the steering MEMS mirror system 122. In one embodiment, light system 132 may include one single light source so that the two projected beams of light remain in phase (not including the generated offset).

For example, in one embodiment, the phase shifting system 134 may include a plurality of beam splitters and/or prisms.

When the system 100 is performing interferometry, the two projected beams of light, having a very small difference in phase (e.g. 10 nanometers), may appear on the surface 102 as fringed lines. However, spacing between the fringes may increase with irregularity of the surface 102. In other words, on a flat surface the projected beams of light may appear as very narrow fringes (or no fringe spacing), whereas on a very coarse (irregular) surface the projected beams of light may appear as very wide fringes.

Referring now to FIGS. 4A and 4B, two different interferometry systems are shown.

Referring now to FIG. 4A, a conventional interferometer is shown. A light source 50 projects a beam of light onto a mirror 51. The mirror 51 reflects the beam of light through a beam splitter 152 (e.g., a prism). The beam splitter 152 splits the beam of light into two offset beams of light. A first beam reflects off of a first surface 153 that is a first distance from the beam splitter 152. A second beam reflects off of a second surface 154 that is a second distance from the beam splitter 152. The second distance is greater than the first distance, which creates a phase shift between the two reflected beams. Both of the reflected beams of light are then directed (through the beam splitter 152) to a receiver 155. For example, the receiver 155 may be a surface that displays a fringe pattern corresponding to a phase difference between the two reflected beams.

However, the conventional interferometer is static (i.e. stationary), and thus may only generate a fringe pattern on a small select area of the receiver 155 (i.e. the surface). Thus, in order to cover a large area (e.g. more than 100 millimeters by 100 millimeters), multiple light sources and multiple high-resolution cameras are required, which increases system size, complexity and/or costs.

Referring now to FIG. 4B, an exemplary embodiment of the interferometry system 120 according to the present disclosure is shown in more detail. A light source 160 projects a beam of light onto a MEMS mirror 162. For example, the light source 160 may be light system 132 and the MEMS mirror 162 may be the steering MEMS mirror system 122. The MEMS mirror 162 reflects the beam of light through a beam splitter 164. For example, the beam splitter 164 may be the phase shift system 134.

The beam splitter 164 splits the beam of light into two and passes one beam through and reflects the other beam using a plurality of surfaces, thus creating a phase offset between the two beams of light. These two beams of light are then projected onto a surface 166. For example, the surface 166 may be surface 102. The two beams of light may create a fringe pattern based on a flatness of the surface 166. More specifically, a more irregular surface may include wider spacing in between the fringes. However, a flat surface may include narrow (or no) spacing in between the fringes.

Due to the precise control of the MEMS mirror 162, the interferometry system may achieve larger resolutions than the conventional interferometer. For example only, the interferometry system 120 may have a resolution of 5 microns in x and z directions. Additionally, the interferometry system 120 may continuously adjust the mirror 162 to vary coverage of the projected fringe pattern on the surface 166. For example only, the fringe pattern may be steered in real time to cover an area of 200 millimeters by 200 millimeters.

Referring again to FIG. 3B, the steering MEMS mirror system 122 projects the one or beams of light (i.e. pattern or fringes) generated by light system 118 or the interferometry system 120 onto the surface 102, as described above. For example, the control module 104 may control the steering MEMS mirror system 122 to project the pattern or fringes to a particular location on the surface 102.

In one embodiment, the control module 104 may control the optics system 130 to create a pattern of one or more structured lines for projection onto the surface 102. More specifically, the control module 104 may control a number of the structured lines, widths of the structured lines, spacing between the structured lines, angles of the structured lines, and/or intensity of the structured lines. Additionally, the control module 104 may control the optics system 130 to create a pattern of one or more shapes for projection onto the surface 102. For example, the control module 104 may control the optics system 130 to create patterns of circles, concentric circles, rectangles, and/or other N-sided polygons (N3) for projection onto the surface 130.

The control module 104 may control the pattern projected based on a feature being measured. More specifically, referring now to FIGS. 5A and 5B, two exemplary methods for controlling the pattern according to the present disclosure are shown.

Figure 5B:
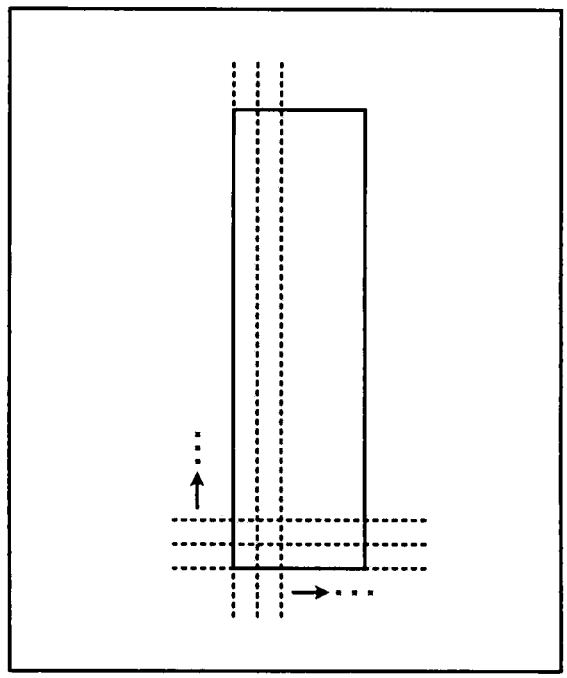
FIGS. 5A-5B are schematics illustrating exemplary methods for processing a hole and a slot, respectively, according to the present disclosure.
Figure 5A:
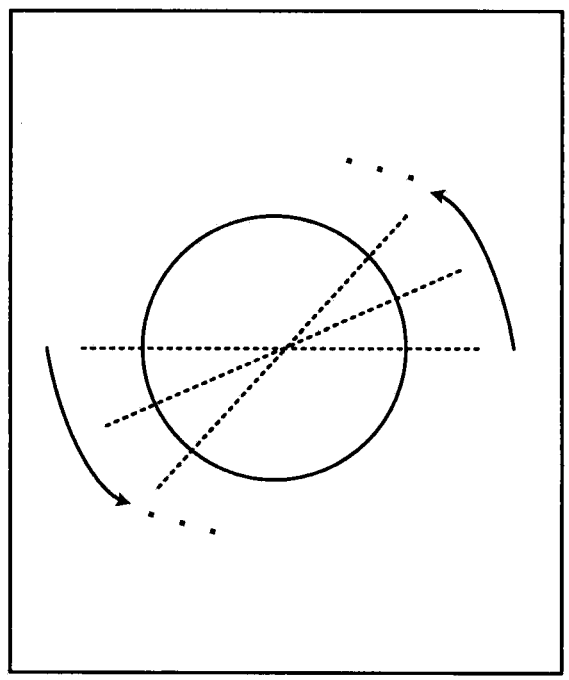

Referring now to FIG. 5A, an exemplary method for processing a hole in a surface is shown. The structured light contour sensing system may project a plurality of lines rotatably about the center of the hole. Thus, the reflected pattern may include a plurality of diametrically opposite points that correspond to the edge of the hole. This method allows for a more precise feature extraction and/or form measurement compared to merely using vertical and/or horizontal lines according to the prior art.

Referring now to FIG. 5B, an exemplary method for processing a slot in a surface is shown. The structured light contour sensing system may project a plurality of horizontal and vertical lines along the dimensions of the slot. Thus, the reflected pattern may include a plurality of points that represent the edges of the slot. However, depending on manufacturing tolerances, some slots may appear to be more like a hole, and thus may also be processed according to the method of FIG. 5A.

Referring again to FIG. 3B, the imaging system 110 receives a second pattern of light or fringed lines of light reflected from the surface 102 and captures the received light for contour sensing of the surface 102 by the control module 104. The received light may be different than the projected light due to a contour of the surface 102. For example, the surface 102 may include a plurality of features having varying depths. For example, the control module 104 may determine a range from the surface 102 based on a phase difference between the received light and the projected light. More specifically, the imaging system 110 may receive the reflected light, tilt the reflected light, and/or focus the reflected light. Furthermore, the imaging system 110 may then capture the received light and transmit corresponding data to the control module 104 for processing.

In one embodiment, the imaging system 110 includes a receiving MEMS mirror system 140, a focusing lens system 142, and an image capturing module 144. The receiving MEMS mirror system 140 receives the reflected light from the surface 102 and directs the received light to the focusing lens system 142. The focusing lens system 142 may include one or more lenses. For example, the control module 104 may control the receiving MEMS mirror system 140 and the focusing lens system 142 to provide precision sensor pointing alignment.

The receiving MEMS mirror system 140 may also tilt the focused light onto the image capturing module 144 to maximize focus by maintaining the Scheimpflug tilt condition. Thus, for example, in one embodiment, a subset of the receiving MEMS mirror system 140 may direct the received light to the focusing lens system 142 while a different subset of the receiving MEMS mirror system 140 may tilt the focused light onto the image capturing module 144. Alternatively, for example, it can be appreciated that two different systems of MEMS mirrors may be implemented.

The control module 104 controls the receiving MEMS mirror system 140 and the focusing lens system 142 to achieve precision that may allow for optic and image processing capabilities adaptable for future technology. More specifically, the control module 104 may control the receiving MEMS mirror system 140 and the focusing lens system 142 to produce the Scheimpflug imaging condition by tilting the focused light onto the image capturing module 144.

In other words, the control module 104 may control the receiving MEMS mirror system 140 and the focusing lens system 142 to increase a field of view (FOV) of the image capturing module 144. The control module 104 may control the receiving MEMS mirror system 140 and the focusing lens system 142 to increase field depth of the image capturing module 144. Additionally, the control module 104 may control the receiving MEMS mirror system 140 and the focusing lens system 142 to maintain a focus condition by controlling a ray path length between the focusing lens system 142 and the image capturing module 144.

Therefore, the image capturing module 144 receives the reflected light from the surface 102 via the receiving MEMS mirror system 140 and the focusing lens system 142 (i.e. after focusing and/or tilting). While one image capturing module 144 is shown, it can be appreciated that a plurality of image capturing modules 144 may be implemented. For example, each of the plurality of image capturing modules 144 may receive a portion of the reflected light corresponding to a sub-area of the surface 102.

The image capturing module 144 transforms the focused light into data (e.g., electricity). In one embodiment, the image capturing module 144 is a charge-couple device (CCD) imager. In another embodiment, the image capturing module 144 is a CMOS (complimentary metal-oxide-semiconductor) imager. For example, the CCD imager may achieve a higher resolution than the CMOS imager, while the CMOS imager may use less power than the CCD imager.

The image capturing module 144 sends the data to the control module 104 for focal adjustments and/or for processing to determine the contour of the surface 102. The control module 104 may determine a quality of focus of the captured light by evaluating the laser line profile captured by the imager. For a Gaussian curve profile, focus is improved by maximizing the peak value and minimizing the width of the laser line. It is important that the dynamic range of the imager is such that the image is not saturated. Based on the quality of focus, the control module 104 control the receiving MEMS mirror system 140 (or subset thereof) to maintain a Scheimpflug tilt condition. This process may be repeatedly continuously in real time to maximize quality of focus, thereby maintaining the Scheimpflug tilt condition.

Additionally, the control module 104 may transform extract and/or track features of the surface 102. Additionally, the control module 104 may output data to surfacing and/or inspection software for modeling and/or additional processing. Furthermore, the control module 104 may adjust the projection system 108 and/or the imaging system 110 based on the extracted 3D features. In other words, for example, the control module 104 may adjust projection of the pattern of light or fringed lines of light onto the surface 102 to for more precise contour sensing.

Figure 6:
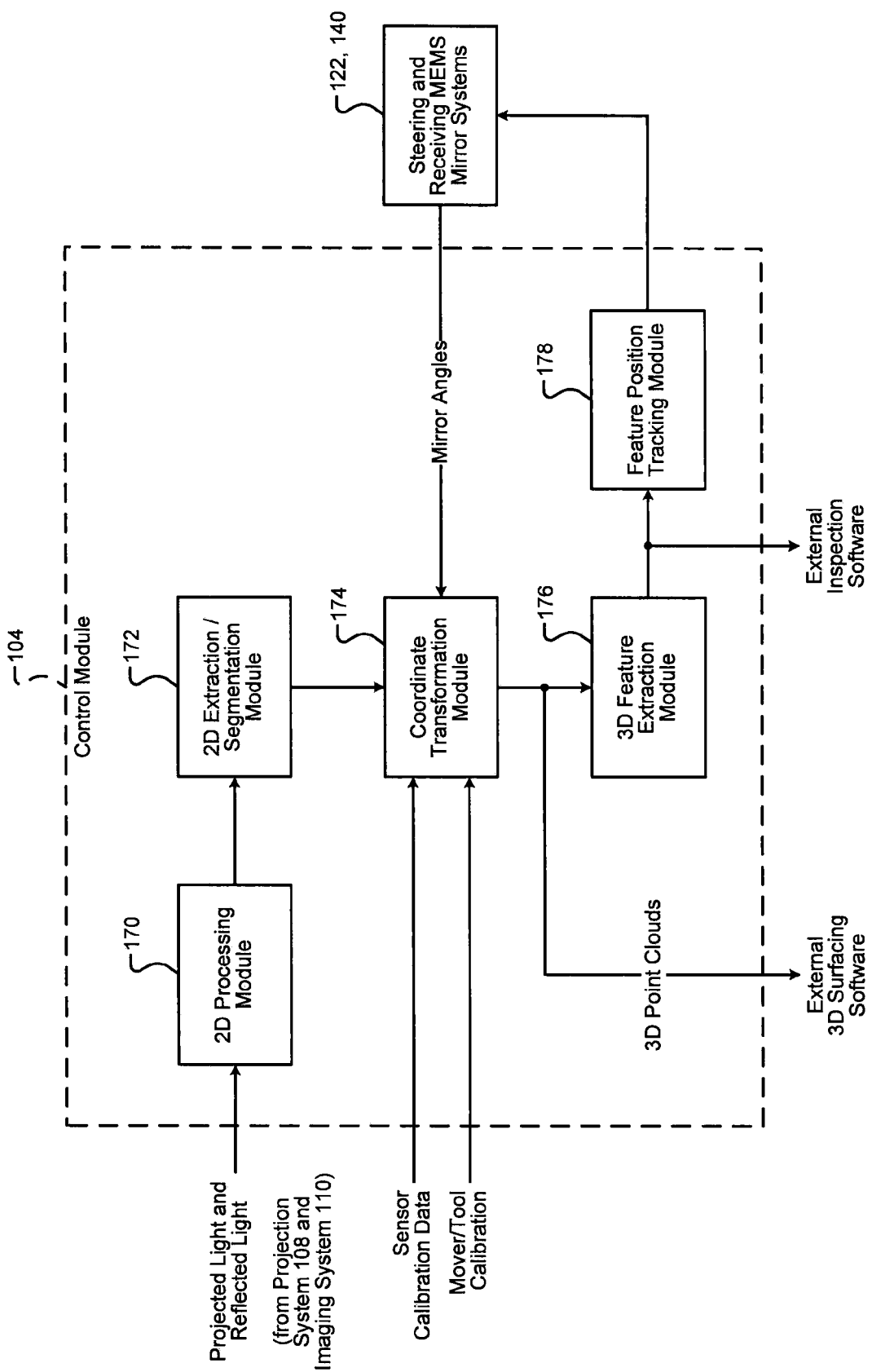
FIG. 6 is a functional block diagram of an exemplary control module of the structured light contour sensing system according to the present disclosure.

Referring now to FIG. 6, an exemplary embodiment of the control module 104 is shown. The control module 104 may include a 2D processing module 170, a 2D extraction/segmentation module 172, a coordinate transformation module 174, a 3D feature extraction module 176, and a feature position tracking module 178.

The 2D processing module 170 receives data corresponding to the projected light and the reflected light. More specifically, the 2D processing module determines differences between the data from the image capturing module 144 (the second image) and data corresponding to the projected light (i.e. the pattern of light or the fringed lines). In one embodiment, the data corresponding to the projected light may be stored in a datastore in the control module 104.

The 2D extraction/segmentation module 172 receives the processed data from the 2D processing module 170. The 2D extraction/segmentation module 172 extracts features from the 2D data. In other words, the 2D extraction/segmentation module 172 segments the processed data into segments corresponding to different features. For example, the segments may correspond to data that exceeds predetermined feature thresholds.

The coordinate transformation module 174 receives the segmented data corresponding to the extracted features. The coordinate transformation module 174 also receives sensor calibration data and mover/tool calibration data. For example, the sensor calibration data may be generated by the accelerometer 112. The mover/tool calibration data may be predetermined calibration data stored in a datastore. However, it can be appreciated that in one embodiment the mover/tool calibration data may be input by a user.

The coordinate transformation module 174 transforms coordinates of the 2D segments into 3D coordinates corresponding to the different features. More specifically, the coordinate transformation module 174 determines depths of particular coordinates (i.e. due to the Scheimpflug tilting). For example, the coordinate transformation module 174 may generate 3D point clouds corresponding to each 2D segment. In one embodiment, the 3D point clouds may be sent to external 3D surfacing software for modeling of the 3D coordinates.

The 3D feature extraction module 176 receives the 3D point clouds. The 3D feature extraction module 176 extracts features from the 3D point clouds. More specifically, the 3D feature extraction module 176 may determine which features exceed predetermined thresholds (e.g. degree of surface curvature) and thus may extract the excessive features. The 3D extracted features may be different than the 2D extracted features. In other words, some 2D extracted features may be disregarded after being transformed into 3D extracted features. In one embodiment, the extracted 3D features may be sent to external inspection software for additional calculations and/or verification of the excessive measurements of the extracted 3D features.

The feature position tracking module 178 receives the extracted 3D features. The feature position tracking module 178 stores the extracted 3D features in a datastore. The feature position tracking module 178 may also adjust the steering MEMS mirror system 122 and/or the receiving MEMS mirror system 140 based on the extracted 3D features. In other words, the feature position tracking module 178 may adjust the system for more precise contour sensing of one or more of the extracted 3D features (e.g., a feedback-based system). However, when the feature position tracking module 178 adjusts the steering MEMS mirror system 122 and/or the receiving MEMS mirror system 140, the change in mirror angles is communicated to the coordinate transformation module 174 for use in future coordinate transformation operations.

Figure 7:
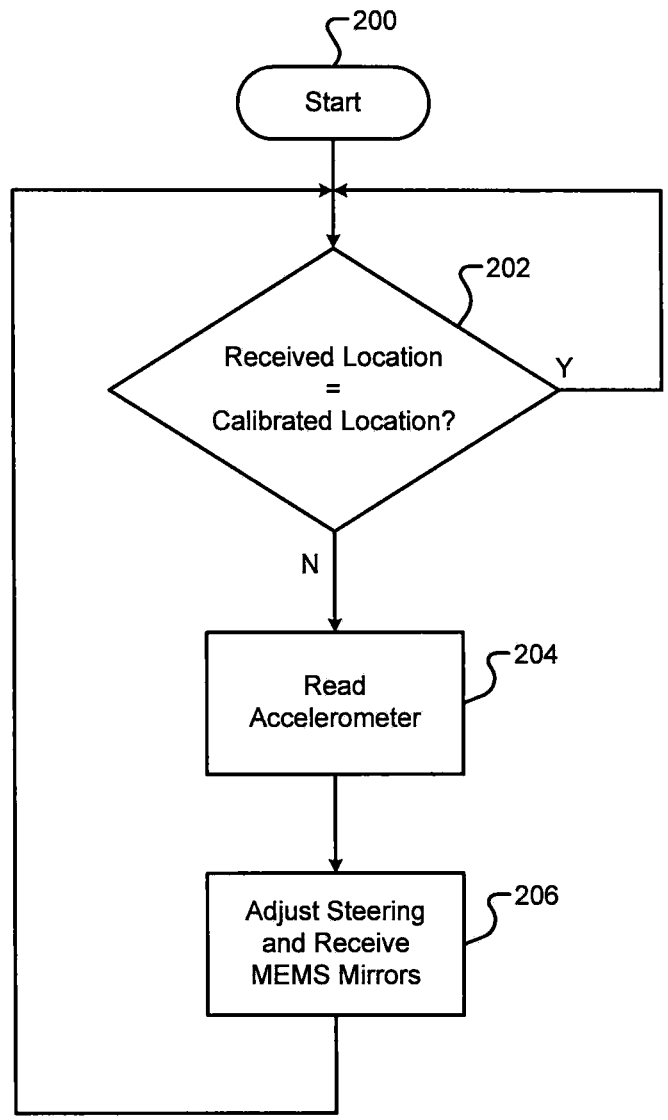
FIG. 7 is a flow diagram of an exemplary method for correcting an angle of the structured light contour sensing system according to the present disclosure.

Referring now to FIG. 7, an exemplary method for correcting an angle of the contour sensing system according to the present disclosure begins in step 200.

In step 202, the system determines whether data corresponding to a position in the reflected light equals data corresponding to a position in the projected light. If true, control returns to step 202 (i.e. no calibration necessary). If false, control proceeds to step 204.

In step 204, the system measures movement using an accelerometer. For example, the system determines an effect of gravity on the system using the accelerometer, such as a tilt of an x-axis and/or a y-axis. In step 206, the system adjusts the steering MEMS mirrors 122 and the receiving MEMS mirrors 140 to compensate for the determined external effect on the system. Control may then return to step 202.

Referring now to FIGS. 8A-8B, exemplary methods for compensating for temperature variations of the contour sensing system according to the present disclosure are shown.

Referring now to FIG. 8A, an exemplary method for adjusting projection due to temperature variations begins in step 250. In step 252, the system measures a temperature of the projection system. For example, the temperature may be generated by the thermocouples 116.

In step 254, the system determines whether the measured temperature is different than a calibrated temperature. For example, the calibrated temperature may be one of a plurality of predetermined temperatures stored in a datastore. If true, control may proceed to step 256. If false, control may return to step 252.

In step 254, the system may adjust the steering MEMS mirrors 122 based on the measured temperature. For example, the system may adjust the steering MEMS mirrors 122 based on a predefined relationship (function g) between MEMS mirror position (y) and temperature (T) (e.g., y=g(T)). In one embodiment, the function (g) may include a plurality of mirror positions (y) and a plurality of corresponding temperatures (T) stored in a datastore. Control may then return to step 252.

Referring now to FIG. 8B, an exemplary method for adjusting imaging (receiving) due to temperature variations begins in step 260. In step 262, the system measures a temperature of the imaging system. For example, the temperature may be generated by the thermocouples 116.

In step 264, the system determines whether the measured temperature is different than a calibrated temperature. For example, the calibrated temperature may be one of a plurality of predetermined temperatures stored in a datastore. If true, control may proceed to step 266. If false, control may return to step 262.

In step 264, the system may adjust the receiving MEMS mirrors 140 based on the measured temperature. For example, the system may adjust the receiving MEMS mirrors 140 based on a predefined relationship (function f) between MEMS mirror position (x) and temperature (T) (e.g., x=f(T)). In one embodiment, the function (f) may include a plurality of mirror positions (x) and a plurality of corresponding temperatures (T) stored in a datastore. Control may then return to step 252.

Figure 9:
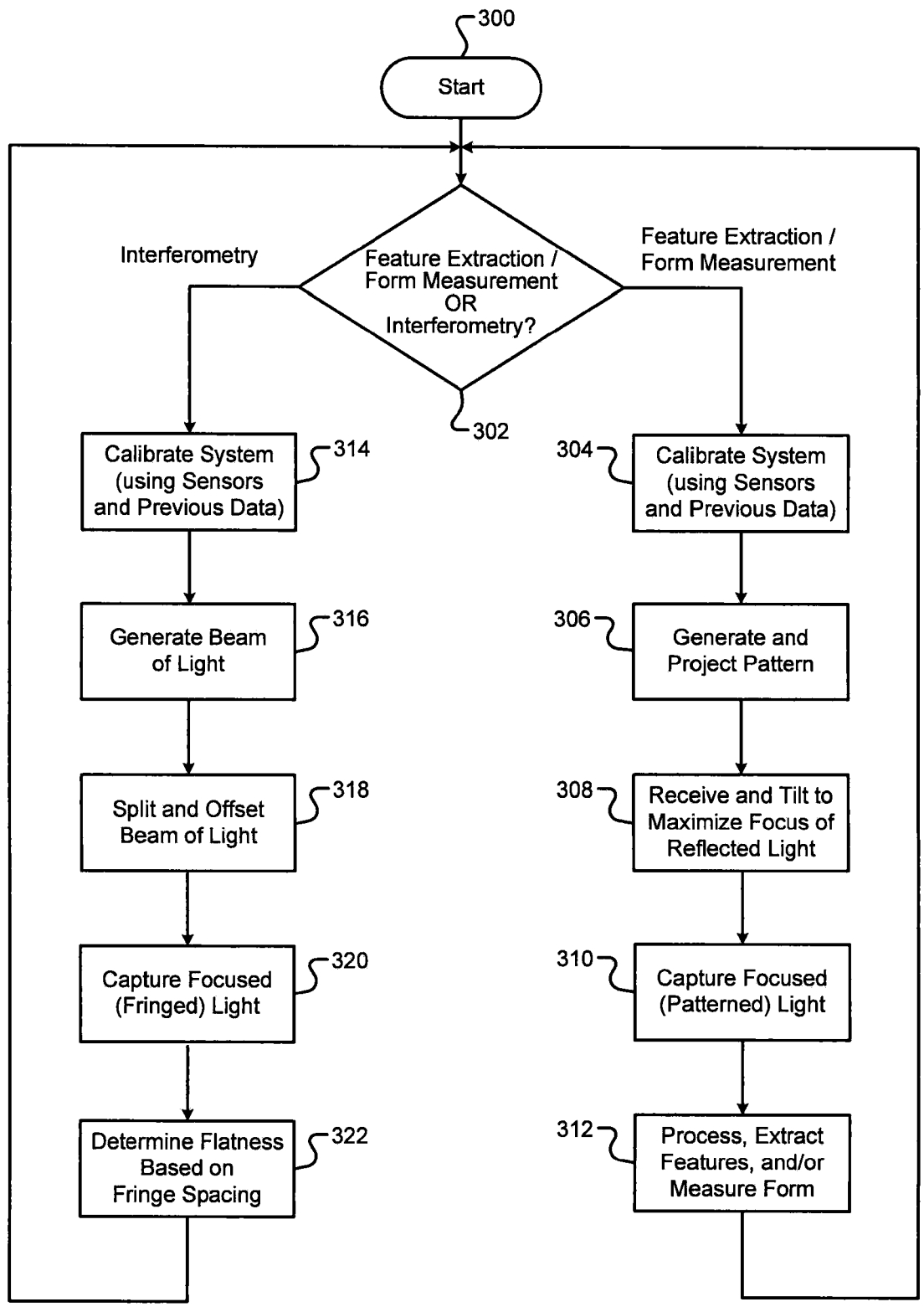
FIG. 9 is a flow diagram of an exemplary method of operating the structured light contour sensing system according to the present disclosure.

Referring now to FIG. 9, an exemplary method for operating the structured light contour sensing system according to the present disclosure begins in step 300. In step 302, the system determines whether feature extraction and/or form measurement is to be performed or whether interferometry is to be performed. If feature extraction and/or form measurement is to be performed, control may proceed to step 304. If interferometry is to be performed, control may proceed to step 314.

In step 304, the system performs calibration based on sensor feedback and/or extracted features or form measurements (i.e. from a previous cycle). For example, the system may calibrate a color and/or intensity of the beam being projected, positioning of the projection or imaging MEMS mirrors, etc.

In step 306, the system generates and projects a first pattern of light onto a surface for contour sensing. More specifically, the system may generate a specific color and/or intensity beam of light and may project a pattern that includes one or more lines and/or shapes onto the surface.

In step 308, the system receives light that is reflected from the surface and directs the reflected light for capturing. More specifically, the system receives the reflected light, directs the reflected light, and tilts the reflected light in order to maximize focus (i.e. Scheimpflug tilt) of the reflected light for the imager.

In step 310, the system captures the focused light for processing purposes. For example, the focused light may be captured by a CCD camera or a CMOS camera.

In step 312, the system processes data corresponding to the focused light for feature extraction and/or form measurement of the surface. Additionally, the system may store the extracted features or form measurements in a datastore and/or output data corresponding to the extracted features for external modeling and/or additional processing. Control may then return to step 302.

In step 314, the system performs calibration based on sensor feedback and/or extracted features or form measurements (i.e. from a previous cycle). For example, the system may calibrate a color and/or intensity of the beam being projected, positioning of the projection or imaging MEMS mirrors, etc.

In step 316, the system generates a beam of light. For example, the system may generate the beam of light using a different light system than is used for feature extraction and/or form measurement.

In step 318, the system splits and offsets the beam of light thus creating two beams of light with a small phase difference (e.g. 10 nm). For example, the beam of light may be split and offset using a plurality of beam splitters and/or prisms.

In step 320, the system captures fringed lines of light reflected from the surface. In step 322, the system measures spacing in between the fringes, and determines a flatness of the surface based on the spacing. For example, a flatter surface may include smaller spacing between fringes. Control may then return to step 302.

According to other features of the present disclosure, a structured light sensor system is presented that is configured for multi-mode operation. More specifically, the structured light sensor system is configured to operate in each of (i) point mode, (ii) line mode, and (iii) area mode. Point mode refers to projection of and imaging of a point of light. Line mode refers to projection of and imaging of a first plurality of points of light, the first plurality of points of light forming a line. Area mode refers to projection of and imaging of a second plurality of points, the second plurality of points forming a plurality of lines, the plurality of lines collectively forming an area. The structured light sensor system generally includes a projection system, an imaging system, and a control module. The structured light sensor system, however, may include other suitable components.

The projection system is configured to project onto a surface either (i) a point of light or (ii) a plurality of points of light forming one or more lines of light, by coordinating operation of the projection system and the imaging system. For example, the control module may control an on-time of the imaging system (i.e., how often images are being captured) with respect to the projection system based on the desired mode of operation. While the control module is described as coordinating control of the projection system and the imaging system, it is appreciated that control circuitry could also be implemented in the projection system and/or the imaging system instead of implementing a control module thereby achieving similar coordinated control.

Figure 10:
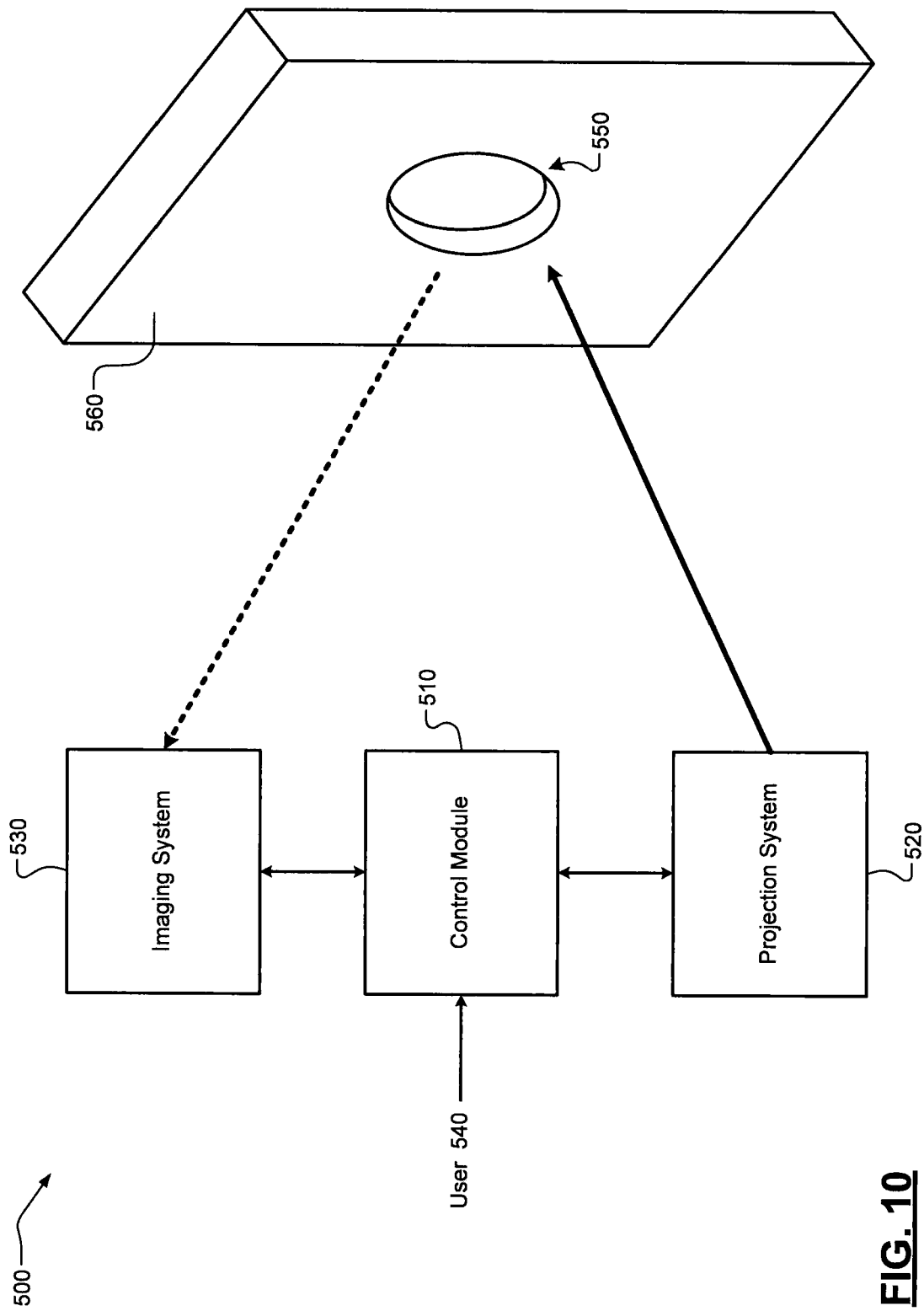
FIG. 10 is a functional block diagram of an example structured light sensor system according to the present disclosure.

Referring now to FIG. 10, an example structured light sensor system 500 is shown. As previously described, the structured light sensor system 500 is configured to operate in each of (i) point mode, (ii) line mode, and (iii) area mode. More specifically, a control module 510 may coordinate control of both a projection system 520 and an imaging system 530 based on a desired mode of operation (point, line, or area). The desired mode of operation may be input or selected by a user 540.

In addition, more than one imaging system 530 may be implemented. More specifically, two or more imaging systems 530 may be implemented to increase a field of view (FOV) of the system 500. For example, two imaging systems 530 may be implemented each having a FOV that partially overlaps with the other thereby increasing an overall scanning width in the X-direction, as disclosed in commonly-assigned U.S. patent application Ser. No. 12/943,344 filed on Nov. 10, 2010, which is herein incorporated by reference in its entirety.

The projection system 520 may include one or more light sources and a MEMS mirror system. The one or more light sources collectively generate a beam of light that is steered by the MEMS mirror system onto or near a feature 550 of a surface 560. The projection system 520 may further include an optics system for manipulating the beam of light. Light from the projection system 520 is preferably scanned at a very high frequency during an exposure cycle of the imaging system. For example, the projection system 520 may generate light pulses at a predetermined frequency.

The scanning speed of the projection system is considerably faster, e.g., 100 times faster, than the exposure cycle, e.g., a shutter speed, of the imaging system. By using a combination of scanning speed and shutter speed, the system 500 can obtain point data, line data, multi-line data, or area illumination. For example, the quality of area illumination is of similar quality as obtained through flood lighting sources, such as LEDs. The advantage of this illumination approach is that it uses the capability of a calibrated MEMS device that can execute reproducible precise paths. Thus, every position of the MEMS mirror system during scanning is precisely known to and/or reported to the associated control module.

The control module 510 controls the projection system 520 to project either (i) a point of light, (ii) a plurality of points of light, the plurality of points of light forming one or more lines of light. In other words, the projection system may project either (i) a point of light (point mode), (ii) a first plurality of points of light, the first plurality of points of light forming a line (line mode), or (iii) a second plurality of points of light, the second plurality of points of light forming a plurality of lines (area mode). In some implementations, the plurality of lines (area mode) may include a combination of both horizontal line(s) and vertical line(s). The plurality of lines, however, may each have the same orientation.

The control module 510 may command one of these three projections based on the desired mode of operation. The control module 510, however, also selectively controls the imaging system 530 based on the desired mode of operation. For example, the control module 510 may control an on-time of the imaging system 530 based on the desired mode of operation (or the commanded mode of operation for the projection system 520), i.e., point, line, or multi-line (area).

Figure 11A:
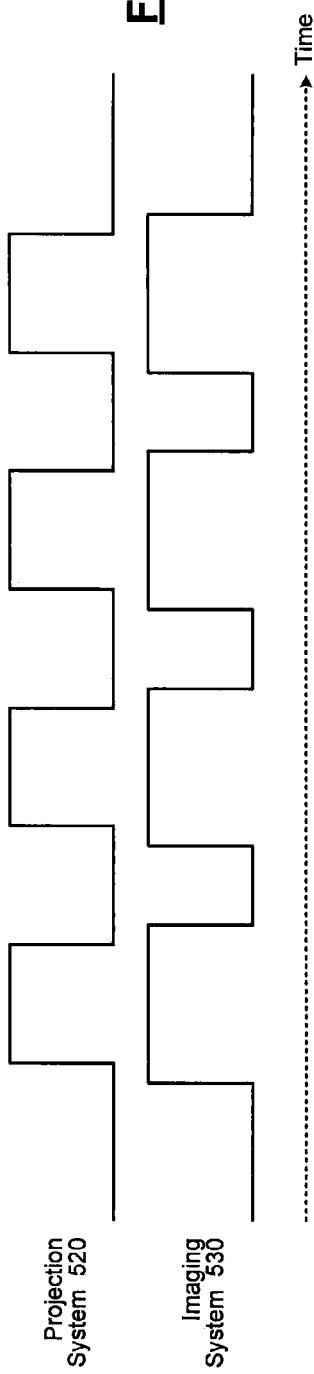
FIGS. 11A-11C are timing diagrams for coordinated control of a projection system and an imaging system in point mode, line mode, and area mode, respectively, according to the present disclosure.

In point mode, the control module 510 commands the projection system 520 to project a point of light on a feature 550 of a surface 560. Point mode may provide for maximum intensity while reducing the background. For example only, point mode may be suitable for dark, shiny surfaces such as composites, black paint, and the like. FIG. 11A illustrates an example of coordinated control of the projection system 520 and the imaging system 530 during point mode.

As shown, the control module 510 enables the imaging system 530 (a high state) for a period of point projection by the projection system 520 (also a high state). In other words, an on-time of the imaging system 530 may be approximately one projection period (or pulse), hereinafter referred to as a first projection period. The on-time for the imaging system 530, however, may also be slightly greater than the first projection period, thereby overlapping both the start of projection and end of projection (as shown).

Figure 11B:
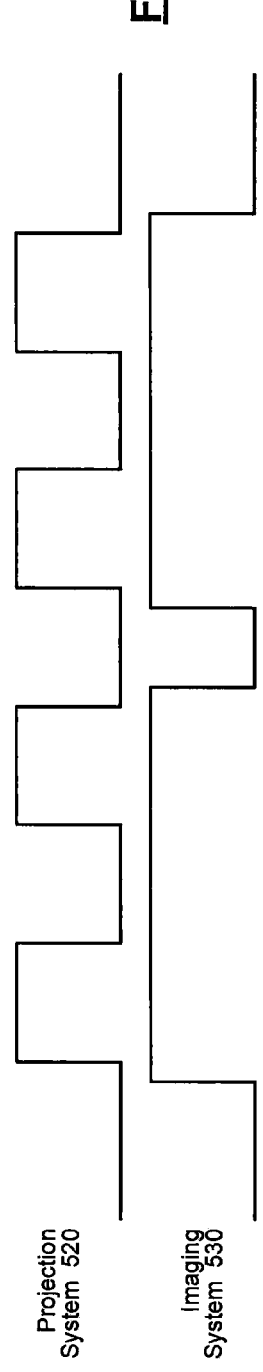

In line mode, the control module 510 commands the projection system 520 to project a first plurality of points of light (i.e., multiple projection pulses) forming a line of light. The first plurality of points extends across the feature 550 of the surface 560. Line mode may provide for 3D imaging of features at maximum resolutions. For example, when combined with efficient sub-pixeling algorithms, the imaging resolution of the system 500 could be improved, i.e., a finer resolution imaging system 530 could be implemented. FIG. 11B illustrates an example of coordinated control of the projection system 520 and the imaging system 530 during line mode.

As shown, the control module 510 enables the imaging system 530 for a period of line projection (i.e., a period for projecting two or more points of light forming a line). In other words, an on-time of the imaging system 530 may be approximately two or more point projection periods (or pulses). The on-time for the imaging system 530, however, may also be greater than the line projection period (two or more point projection periods) by the projection system 520, thereby overlapping both the start of projection and end of projection (as shown).

Figure 11C:
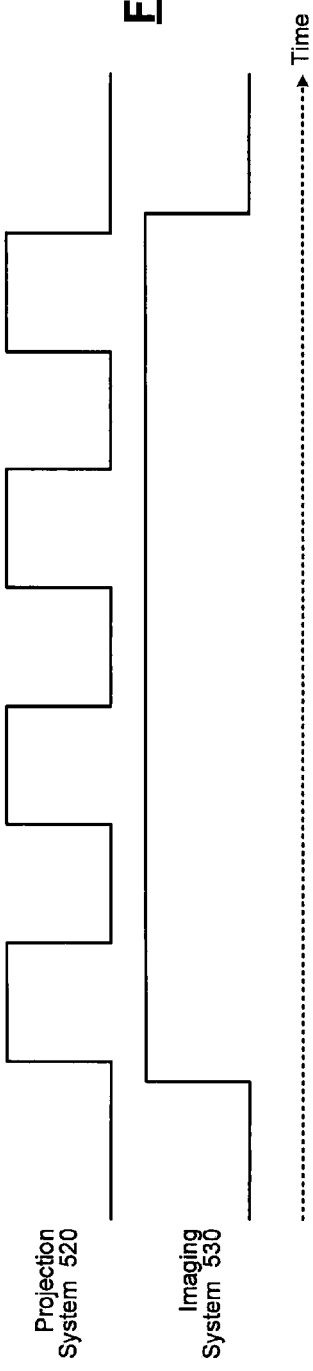

In area mode, the control module 510 commands the projection system 520 to project onto the feature 550 a second plurality of points of light forming a plurality of lines of light. As previously mentioned, in some implementations the plurality of lines of light may include at least one horizontal line of light and at least one vertical line of light (e.g., perpendicular lines). Each of the plurality of lines of light, however, may have a same orientation (e.g., parallel lines). Other numbers of lines and angular configurations, however, may also be projected. Area mode may provide for imaging of large flat areas in a single exposure of the imaging system 530. FIG. 11C illustrates an example of coordinated control of the projection system 520 and the imaging system 530 during area mode.

As shown, the control module 510 enables the imaging system 530 for an area projection period (i.e., a period for projection four or more points of light forming two or more lines of light). In other words, an on-time of the imaging system 530 may be approximately four or more point projection periods (or pulses). As previously described, however, the enable period for the imaging system 530, however, may also be greater than the area projection period (four or more point projection periods) by the projection system 520, thereby overlapping both the start of projection and end of projection (as shown).

Additionally, while the line projection period and the area projection period are defined with respect to the point projection period, it is appreciated that depending on a duty cycle or pulse frequency of the projection system 520 during a given mode of operation, the relative lengths of each of these projection periods may vary. In other words, the imaging system 530 may have an on-time for first, second, and third periods for point mode, line mode, and area mode respectively.

Figure 12:
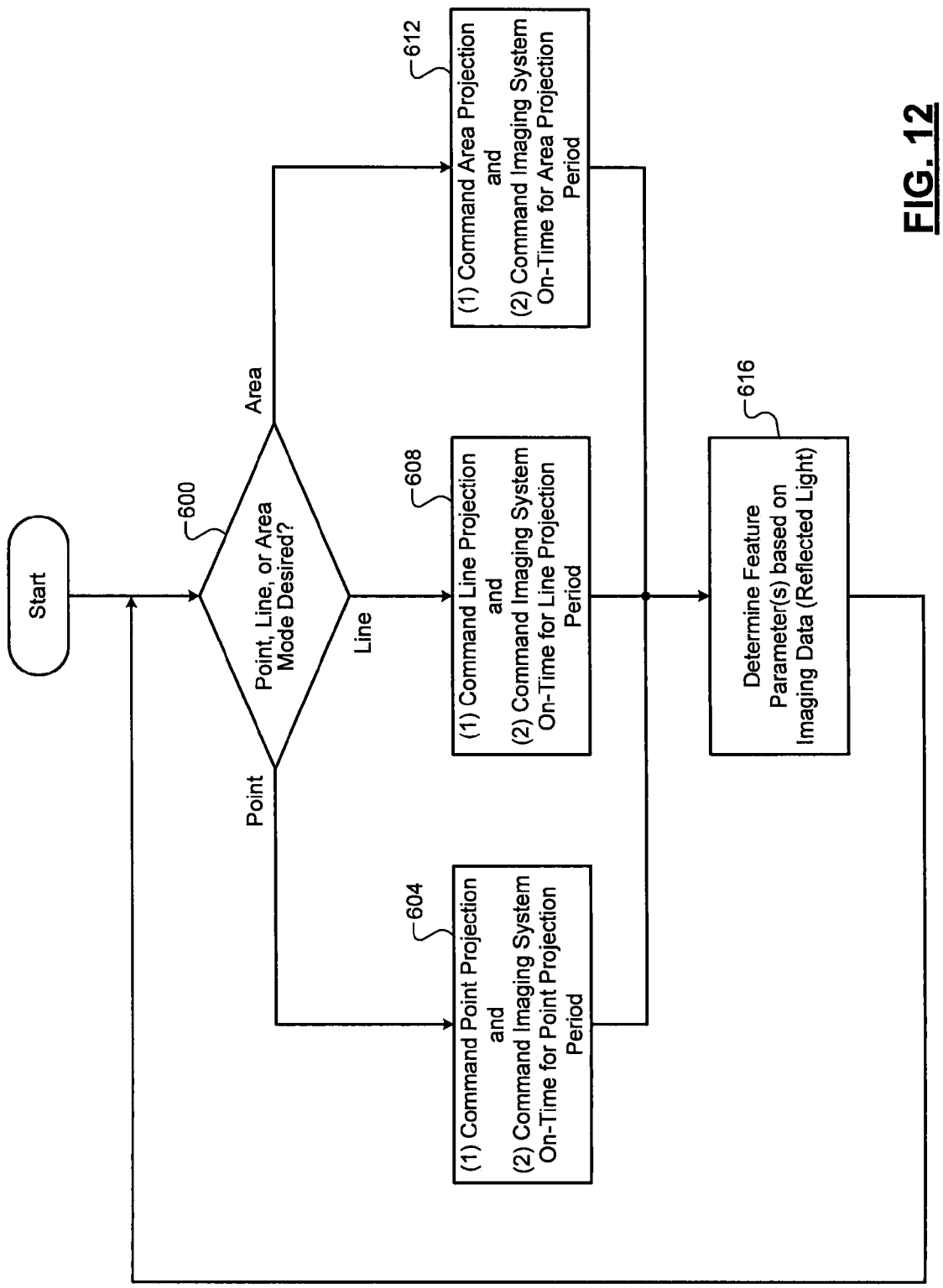
FIG. 12 is a flow diagram of an example method for coordinating control of a structured light sensor system to operate in each of point mode, line mode, and area mode, according to the present disclosure.

Referring now to FIG. 12, an example method for coordinating a projection system and an imaging system to operate in each of (i) point mode, (ii) line mode, and (iii) area mode begins at 600. At 600, the control module 510 determines the desired mode of operation. As previously described, the desired mode of operation may be input or selected by a user. If point mode is desired, control may proceed to 604. If line mode is desired, control may proceed to 608. If area mode is desired, control may proceed to 612.

At 604, the control module 510 may (i) command the projection system 520 to project a point of light onto the feature 550 of the surface 560 and (ii) command the imaging system 530 for an on-time of approximately (or slightly greater than) the point projection period. Control may then proceed to 616.

At 608, the control module 510 may (i) command the projection system 520 to project a first plurality of points forming a line onto the surface 560 extending across the feature 550 and (ii) command the imaging system 530 for an on-time of approximately (or slightly greater than) the line projection period (two or more point projection periods). Control may then proceed to 616.

At 612, the control module 510 may (i) command the projection system 520 to project onto the surface on or near the feature 550 a second plurality of points forming a plurality of lines of light and (ii) command the imaging system 530 for an on-time of approximately (or slightly greater than) the area projection period (four or more point projection periods). Control may then proceed to 616.

At 616, the control module 510 may determine a parameter of the feature 550 based data collected by the imaging system 530. The parameter may include a dimension or other suitable parameters related to feature dimension. For example only, the other suitable parameters may include area, depth, or volume. Control may then return to 600.

According to other features of the present disclosure, a structured light sensor system is presented that is configured to both determine and project a parameter of a feature on a surface. More specifically, the structured light sensor system is configured to both determine the parameter of a feature on a surface and then project the dimension onto the surface. The structured light sensor system may determine the dimension of the feature according to the methods previously described herein. The parameter may include, but is not limited to, a dimension, flatness, an area, or a volume. For example, the dimension may be 2D measurements such as width, height, depth, radius, diameter, circumference, etc.

Referring again to FIG. 10 and as previously described, the structured light sensor system 500 may first project a first pattern of light onto the feature 550 of the surface 560. The imaging system 530 may then capture an image of the surface 560, the captured image including light reflected off of the surface 560. The control module 510 may then generate data based on the captured image, i.e., digitize the captured image, and then determine a parameter of the feature 550 based on the generated data.

After determining the parameter of the feature 550, the structured light sensor system 500 may then project a second pattern of light onto the surface 560. Instead of projection for measurement purposes, however, the second pattern of light may be controlled to display the determined parameter on the surface 560. The control module 510 may control the projection system 520 based on the determine parameter. Rather, the control module 510 may control the projection system 510 to manipulate the projected second pattern of light into a readable display of the determined parameter. For example, the second pattern of light may include numbers and/or measurement units.

After projecting the determined parameter onto the surface 560, a user of the structured light sensor system 500 may then easily read the determined parameter from the surface 560. Utilizing the same structured light sensor system 500 to communicate the determined parameter to the user decreases costs associated with other modes of communicating with the user such as a display or a computer. Furthermore, projecting the determined parameter of the feature 550 may be a faster way of communicating the measurements results to the user because the user can be focused in the same general location (for example, without looking back and forth between measurement of the feature 550 and an external display or computer).

Figure 13:
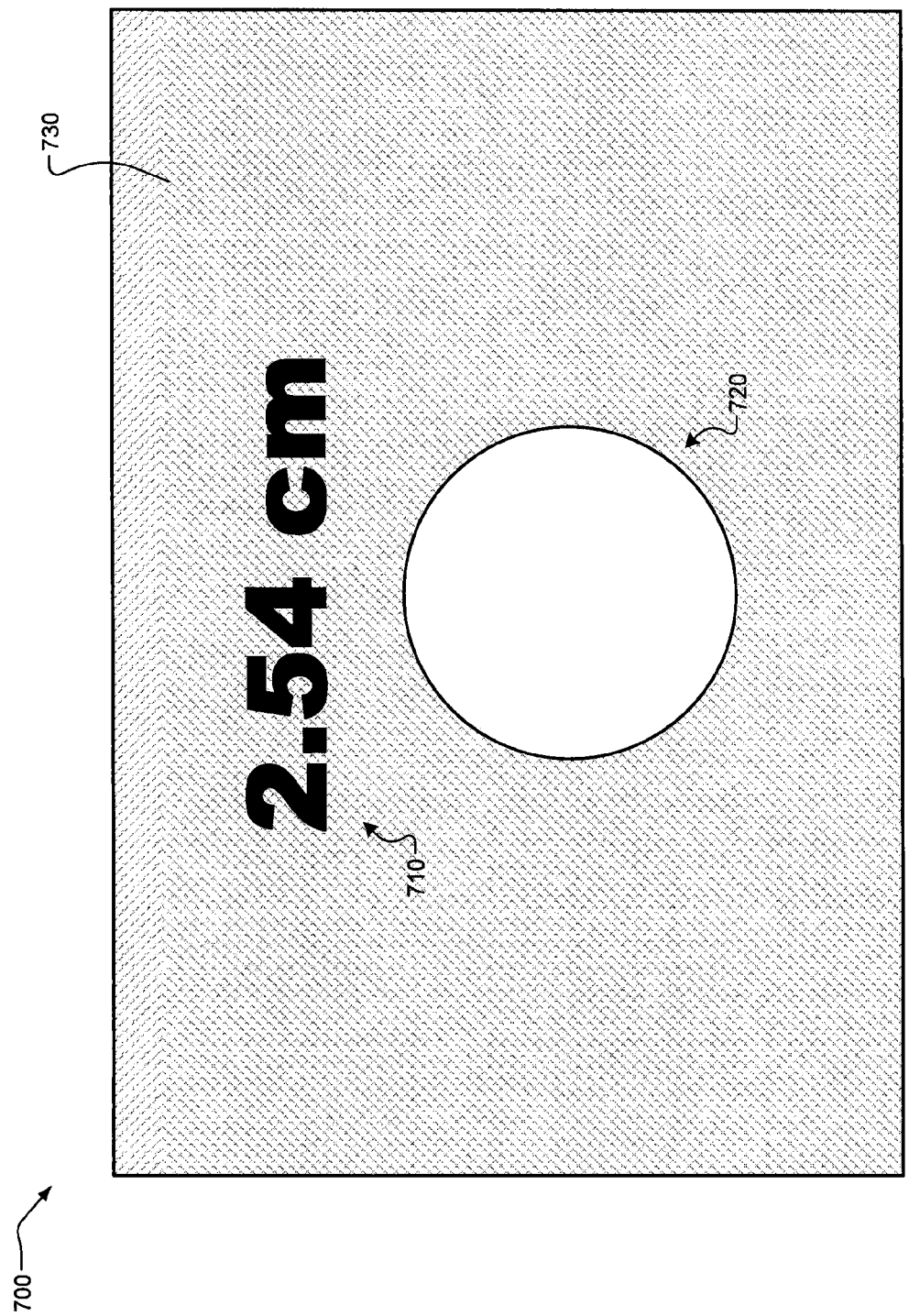
FIG. 13 is a view of an example projection of a parameter of a feature both determined by and projected by a structured light sensor system, according to the present disclosure.

FIG. 13 illustrates an example view 700 of a projection 710 of a determined parameter of a feature 720 on a surface 730. As shown, the projected parameter 710 ("2.54 cm") represents a diameter of the hole/aperture feature 720. As previously described, however, the projected parameter 710, however, may include other combinations of numbers and/or measurement units. While the projected parameter 710 is shown located above the feature 720, the projected parameter 710 may also be located at other suitable locations on the surface 730.

Rather, the projected parameter 710 may alternatively be located left, right, or below the feature 720, and may also be either closer to or further from the feature 720. For example, the control module 510 may control the projection system 520 to project the determined parameter at or within a predefined distance from the feature 720. This predefined distance could be either predetermined and stored in memory or input by the user. In addition, the location with respect to the feature 720 may also be either predetermined and stored in memory or input by the user.

Figure 14:
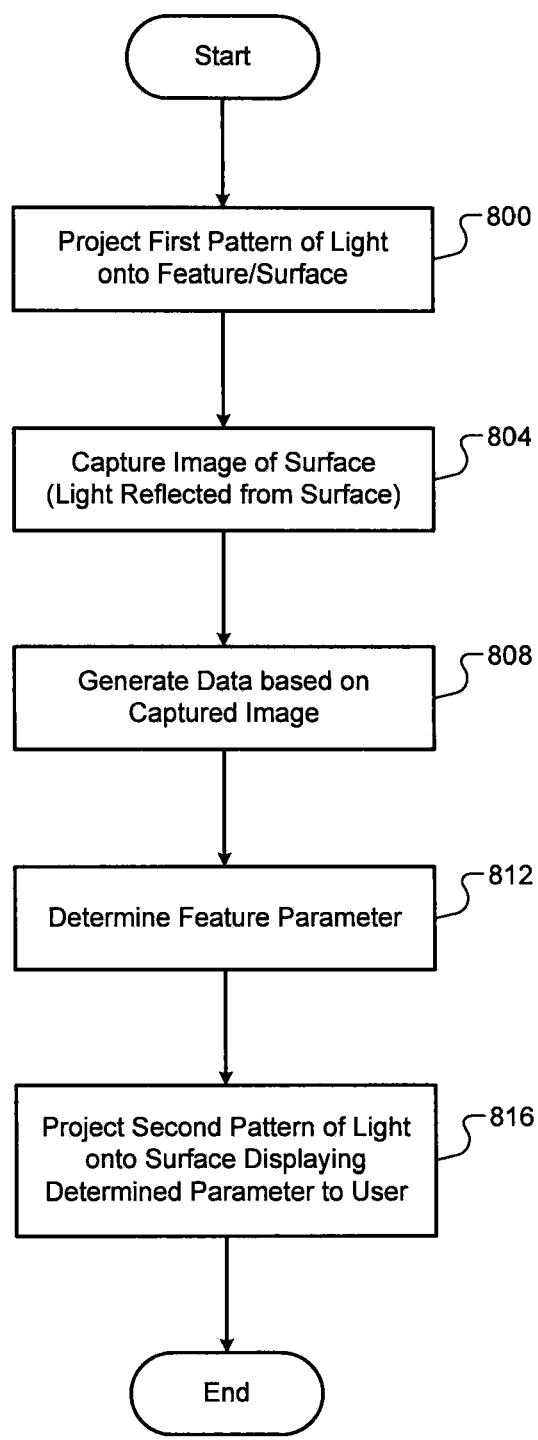
FIG. 14 is a flow diagram of an example method for determining a parameter of a feature on a surface using a structured light sensor system and projecting the determined parameter onto the surface using the structured light sensor system.

Referring now to FIG. 14, an example method for determining and projection a dimension of a feature on a surface begins at 800. At 800, the control module 510 controls the projection system 520 to project a first pattern of light onto or near a feature 550 of the surface 560. At 804, the control module 510 controls the imaging system 530 to capture an image of the surface 530, the captured image including light reflected off of the surface 560. At 808, the control module 510 generates data based on the captured image. At 812, the control module 510 determines a parameter of the featured 550 based on the generated data. At 816, the control module 510 controls the projection system 520 to project a second pattern of light onto the surface 560, the second pattern of light displaying the determined parameter to a user. Control may then end or return to 800 for additional cycles.

According to other features of the present disclosure, a device for measuring a contour of a surface is presented. The device includes a housing and a plurality of components of a structured light sensor system disposed within the housing. For example only, the components within the housing may include the system 100 of FIG. 3B. The components disposed within the housing, however, generally include the following: an imaging lens system, an image capturing device, a first set of MEMS mirrors, and a control module.

The imaging lens system is configured to focus light reflected from the surface using at least one lens. The imaging lens system has a corresponding lens plane of focus. The light reflected from the surface is indicative of the contour of the surface. The image capturing device is configured to capture the focused light and generate data corresponding to the captured light. The image capturing device has a corresponding image plane of focus that is not parallel to the lens plane of focus.

The first set of MEMS mirrors are configured to direct the focused light to the image capturing device. The control module is configured to (i) receive the data from the image capturing device corresponding to the captured light, (ii) determine a quality of focus of the captured light based on the received data, and (iii) control the first set of MEMS mirrors based on the quality of focus to maintain a Scheimpflug tilt condition between the lens plane of focus and the image plane of focus.

Figure 15:
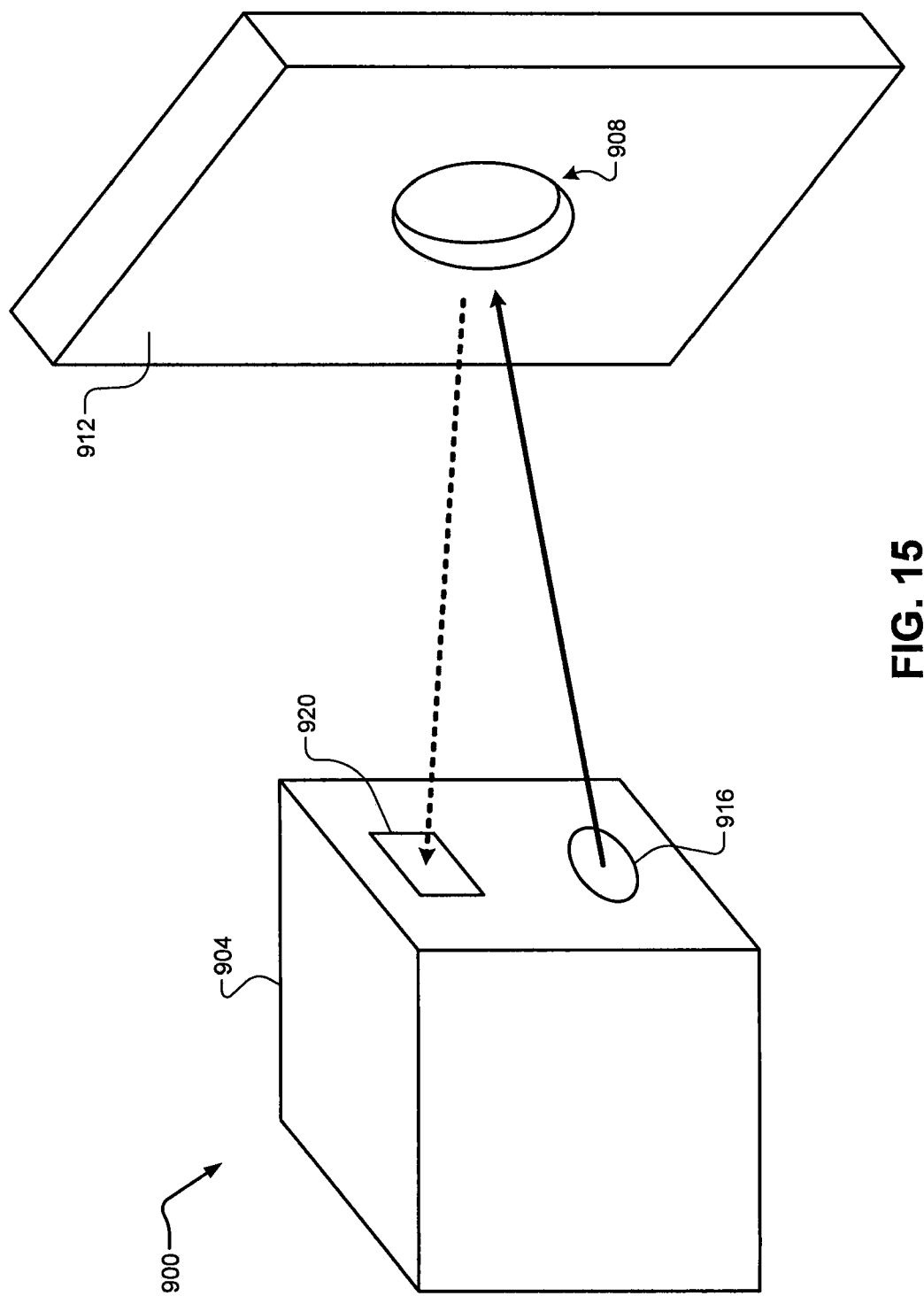
FIG. 15 is a diagram of an example device having a housing the includes a structured light sensor system, according to the present disclosure.

Referring now to FIG. 15, an example device 900 is shown that includes a housing 904 and components of a structured light sensor system disposed within the housing. The housing 904 may include any of the various embodiments of the structured light sensor systems previously described herein. Furthermore, the housing 904 may include other suitable components or may include additional or fewer components than in the embodiments previously described herein. As previously mentioned, however, the housing 904 may generally include the following: an imaging lens system, an image capturing device, a first set of MEMS mirrors, and a control module (all within the housing 900 and therefore not shown).

As previously described, the device 900 projects a pattern of light onto or near a feature 908 of a surface 912. For example, as shown the feature 908 may be a hole or a similar aperture. The device 900 may project the pattern of light using a projection system that includes one or more light sources, an optics system, and a first MEMS mirror system. The device 900 may project the light onto the surface 912 through a first opening 916 in the device 900. The device 900 may then receive light reflected off of the surface 912 (indicative of the feature 908) through a second opening 920.

The light received via the second opening may be steered and captured by an imaging system. The imaging system may include a second MEMS mirror system, an imaging lens system, and an image capturing device. A control module within the housing 900 may (i) determine a quality of focus of the captured light and (ii) control the second set of MEMS mirrors based on the quality of focus to maintain a Scheimpflug tilt condition between a lens plane of focus and an image plane of focus. The control module may also process the data to determine parameter(s) of the feature 908.

Figure 16:
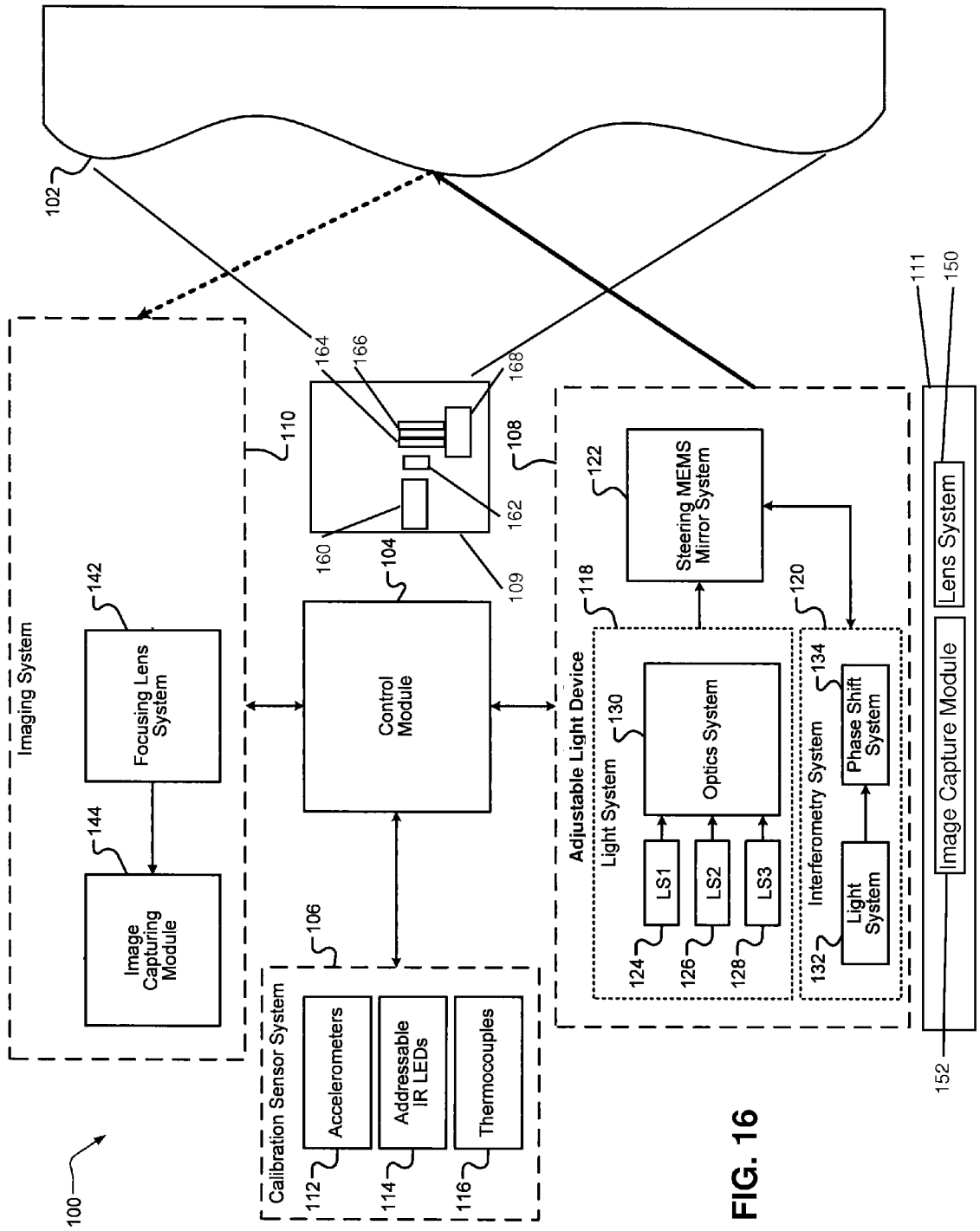
FIG. 16 is a block diagram of a system including a white light projection module and an adaptive light device module.

Now referring to FIG. 16, the system described in FIG. 3b may be implemented to include a field projection system 109. The field projection system 109 may be in communication with the control module 104. The field projection system 109 may be a white light system. The white light system may generate an encoded line pattern, such as a white light moire fringe projection system. Accordingly, the field projection system 109 may include a light source 160, such as a white light source. The light source 160 may be a halogen source, although various other types of white light emitting technologies may be used. The field projection module 109 may include a lens system 162 configured to generate a generally uniform field with an appropriate divergence for the surface 102 to be measured. In addition, the system may include a plurality of gratings 164, 166. The light field may be projected through a first and second grating 164, 166 to create a beating pattern that may be seen on the part as a moire fringe pattern. Further, a phase shifting device 168 may be attached to one or more of the gratings 164, 166 to change the location or angle of the gratings relative to one another to generate a phase shift of the moire fringe pattern projected on to the surface 102. One or more images may be taken at each phase position. The brightness or a gray level value at each pixel position may be analyzed for each phase of the moire fringe pattern imaged on the part. The more different phases that are captured, the better the software can solve for system variations.

In this configuration, the imaging system 110 includes a focusing lens system 142 and an image capturing module 144. The focusing lens system 142 receives the reflected light from the surface 102 and directs the received light to the image capturing module 144. The focusing lens system 142 may include one or more lenses.

In addition, the system may also include a second imaging system 111, including a lens system 150 and an image capture module 152. The lens system 150 may direct the light reflected from the surface 102 to the image capture module 152 where an image of the pattern from the field projection unit 109 or the adaptive light device 108 may be captured. The adaptive light device may be a projection system 108 as described with regard to FIG. 3B, for example a laser system with a programmable MEMS mirror. Using the first imaging system 110 together with the second imaging system 111 the system may operate in a stereo mode to provide better coverage for the angular variations in the surface 102, as well as, allowing the system to better resolve the distance from the system 100 to the surface 102 based on known triangulation methods using the viewing angle of the first and second imaging system 110, 111.

Figure 17:
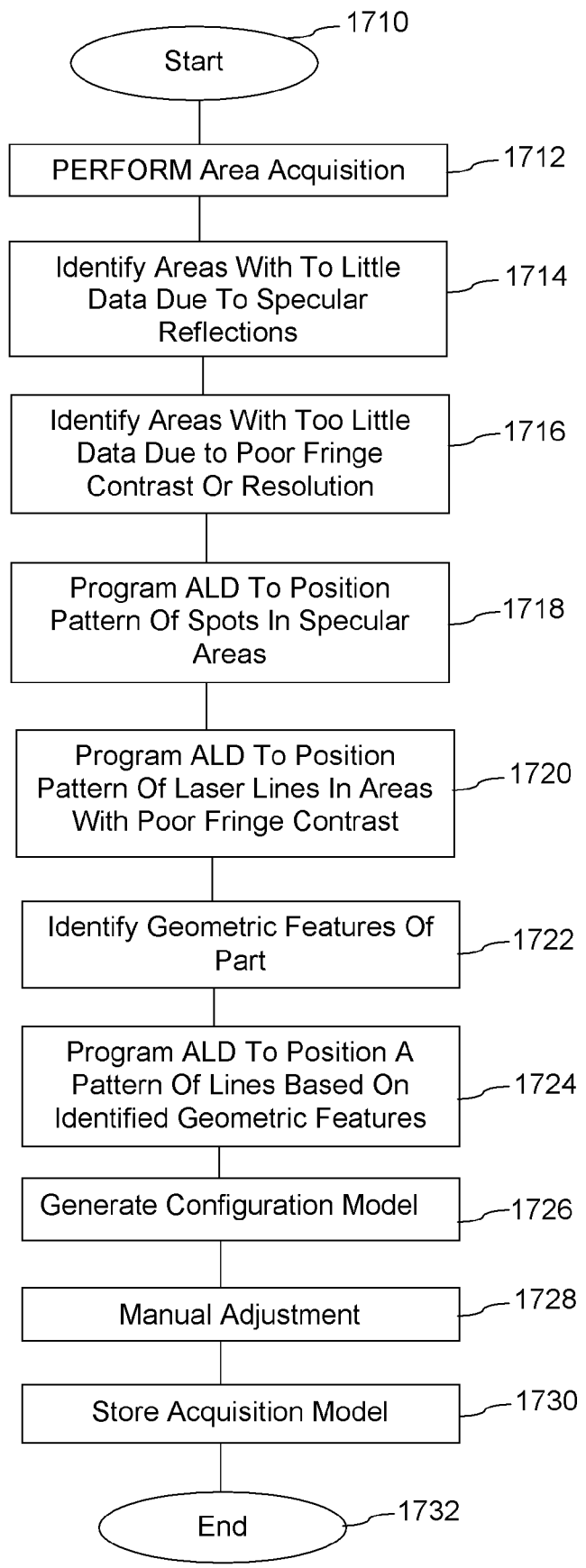
FIG. 17 is a flow chart illustrating a method for acquiring data with a field projection system and adaptive light device.

Now referring to FIG. 17, a method for acquiring data using a field projection system and an adaptive light device. The method 1700 starts in block 1710. In block 1712, the field projection system illuminates a field on the surface 102 and performs an area acquisition, as denoted by block 1712. The system may be a white light moire fringe projection system and as such the acquisition may be performed by a single imager or multiple imagers in a stereo mode. Further, multiple images may be captured during the acquisition. For example, multiple images may be acquired where each image captures a different phase shift of the projected moire fringe pattern. Accordingly, 3D depth data may be calculated from the images captured at multiple different phases. Through analysis of the data the system may identify areas with too little data due to specular reflections, as denoted by block 1714. For example, the brightness or gray level for each pixel may be analyzed and if the gray level value is above a given threshold it may indicate that specular reflections are being received from the surface. Specular reflections often saturate the pixels of the imager and, therefore, no change in the brightness of that pixel may be seen as the phase of the moire fringe pattern changes. One example of specular reflection may be seen in FIG. 18. The moire fringe pattern may include a plurality of alternating light fringes 1812, 1816 and dark fringes 1810, 1814, 1820. A specular reflection region 1830 may appear as a bright spot in the image. The bright spot in the region 1830 may disrupt the fringe pattern and may cause little or no change in the brightness of the pixels as the phase of the fringe pattern changes because the pixels in the detector may be at or near saturation.

Figure 19:
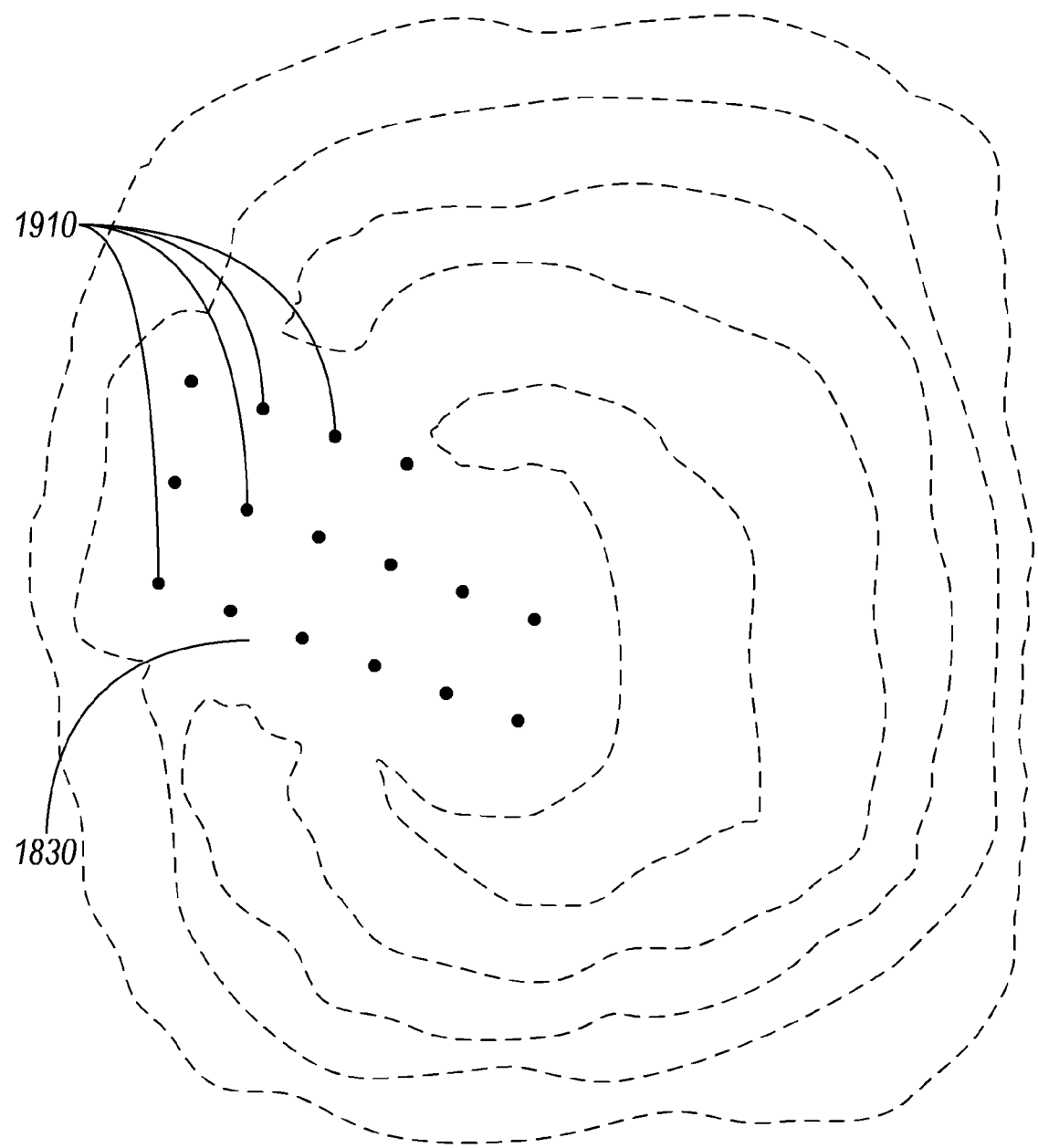
FIG. 19 is a representative laser spot pattern for use with the fringed data of FIG. 18.

Referring again to FIG. 17, the system may program the adaptive light device to position a pattern of spots in the specular areas, as denoted in block 1718. For example, the adaptive light device may program a plurality of laser spots 1910 within the specular area 1830, as shown in FIG. 19. The laser spots 1910 may be imaged by one or more image capture modules of the system to determine the distance from the sensor to the surface of the part using various triangulation or interferometry techniques. Using small high-intensity spots from the laser of the adaptive light device provides the image capture modules with far greater return than may be available from the field of projection module. This is particularly true in the instance of a white light moire fringe projector.

Again referring to FIG. 17, the system may identify areas where too little data is available due to poor fringe contrast or poor fringe resolution, as denoted by block 1716. In this instance, the return from the surface may be very low, possibly at an inside corner of a part where the geometry does not allow proper delivery of the projected light field. Therefore, there may be little difference in the brightness between a pixel in one phase of the moire fringe pattern and another phase of the moire fringe pattern. Alternatively, the change in the depth of a region of the surface may be steep and, therefore, many fringe transitions occur over a very small area. As such, the imager may not be able to resolve the change in phase appropriately. One example may be seen in FIG. 20.

Figure 18:
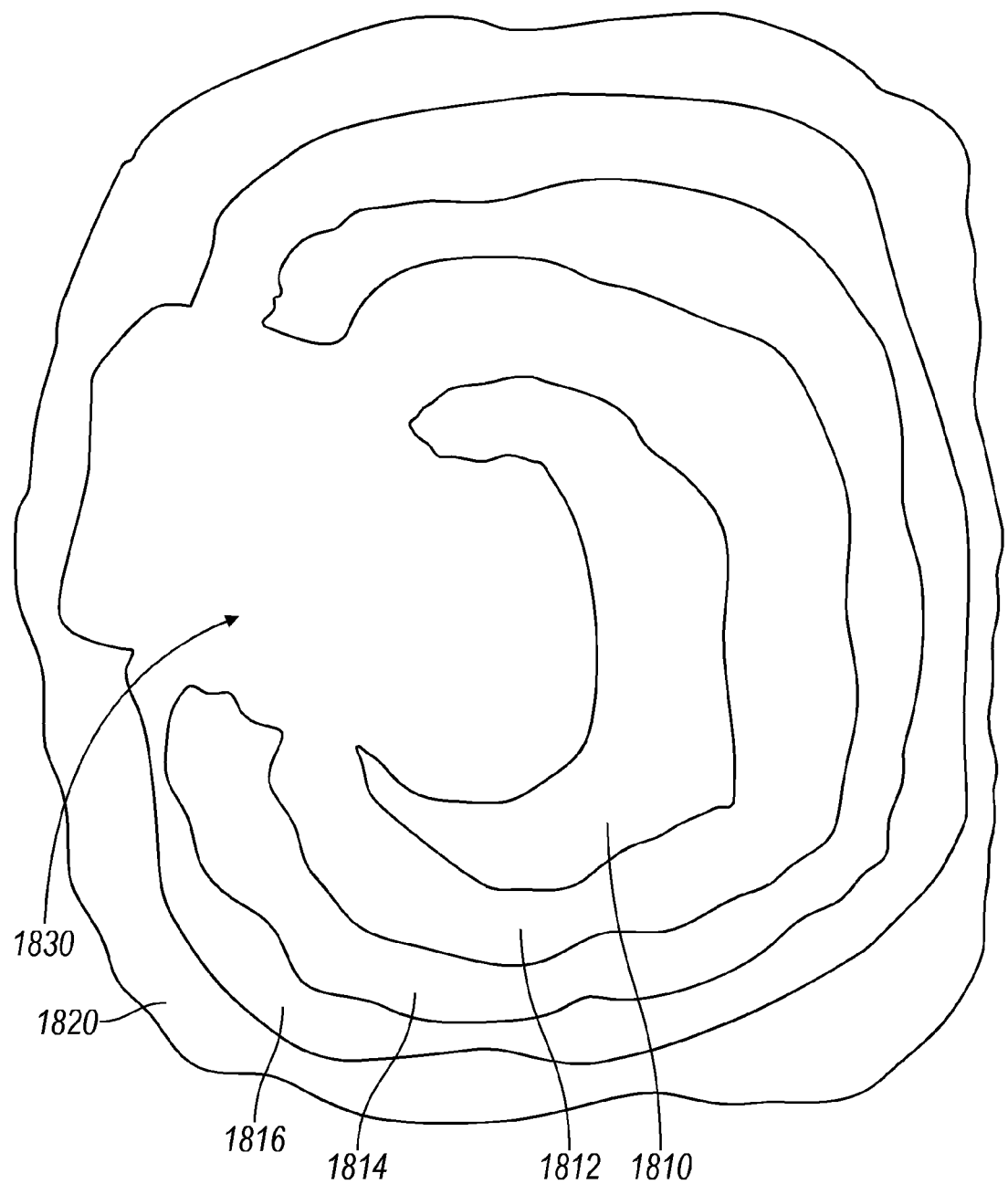
FIG. 18 is a representation of a fringe pattern with excessive specular reflection.
Figure 20:
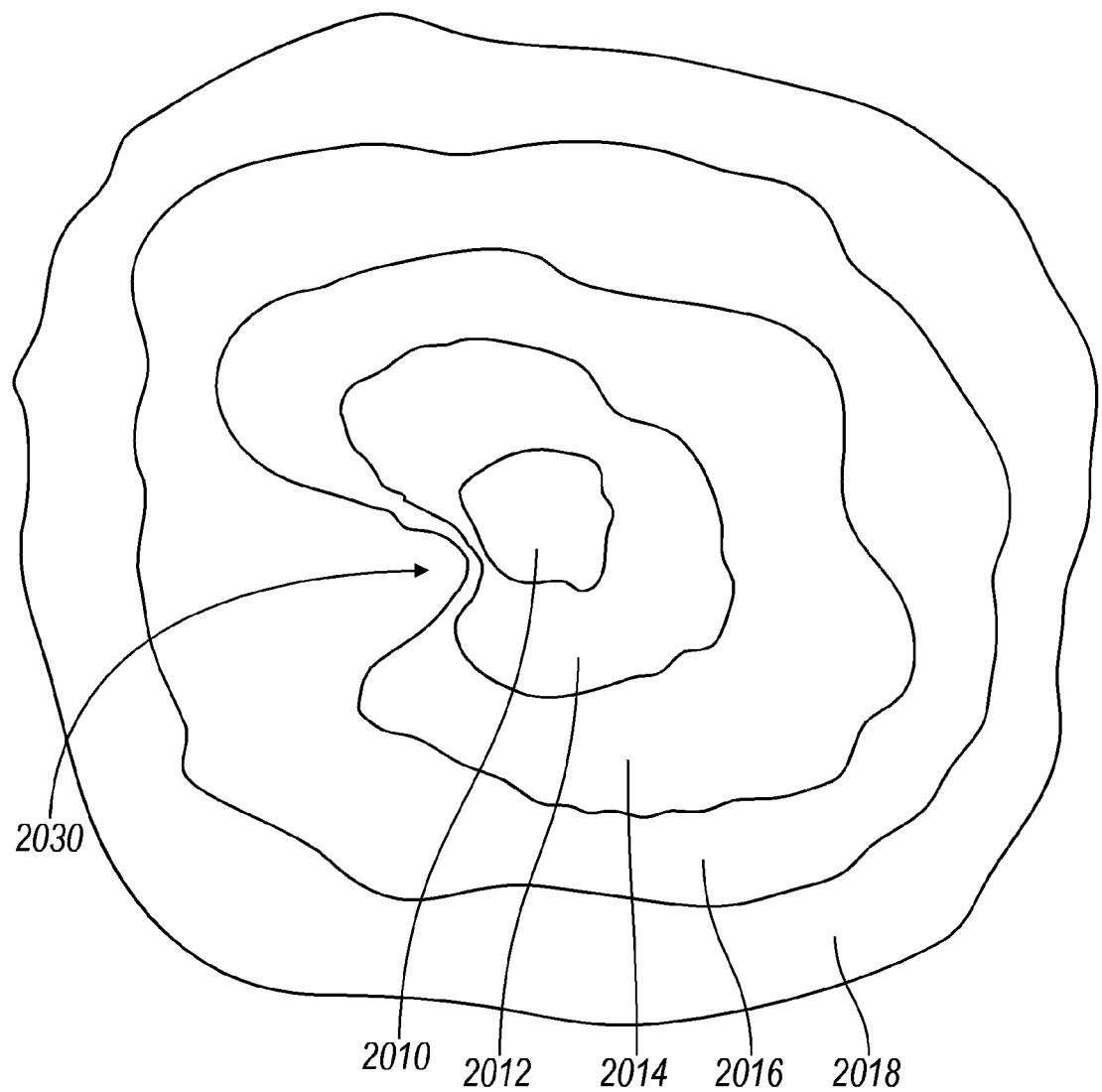
FIG. 20 is a fringe pattern representative of an image with poor fringe resolution.

Similar to FIG. 18, FIG. 20 includes a white light moire fringe pattern. The white light moire fringe pattern includes alternating light fringes 2010, 2014, 2018 and dark fringes 2012, 2016. The image includes a region 2030 with a steep change in slope of the surface. Therefore multiple fringe transitions occur in a very small area of the image. Accordingly, these areas may be identified by thresholding the difference between the brightness at each pixel location at different phases of the moire fringe pattern.

As denoted in block 1720, the program may utilize the adaptive light device to position a structured pattern over the areas with poor fringe contrast or poor fringe resolution to acquire data in the region 2030. The adaptive light device may use laser lines that are projected in a parallel line pattern. The line pattern may be used to acquire data in the region 2030 using triangulation techniques. This technique may be better understood with regard to FIG. 21.

Figure 21:
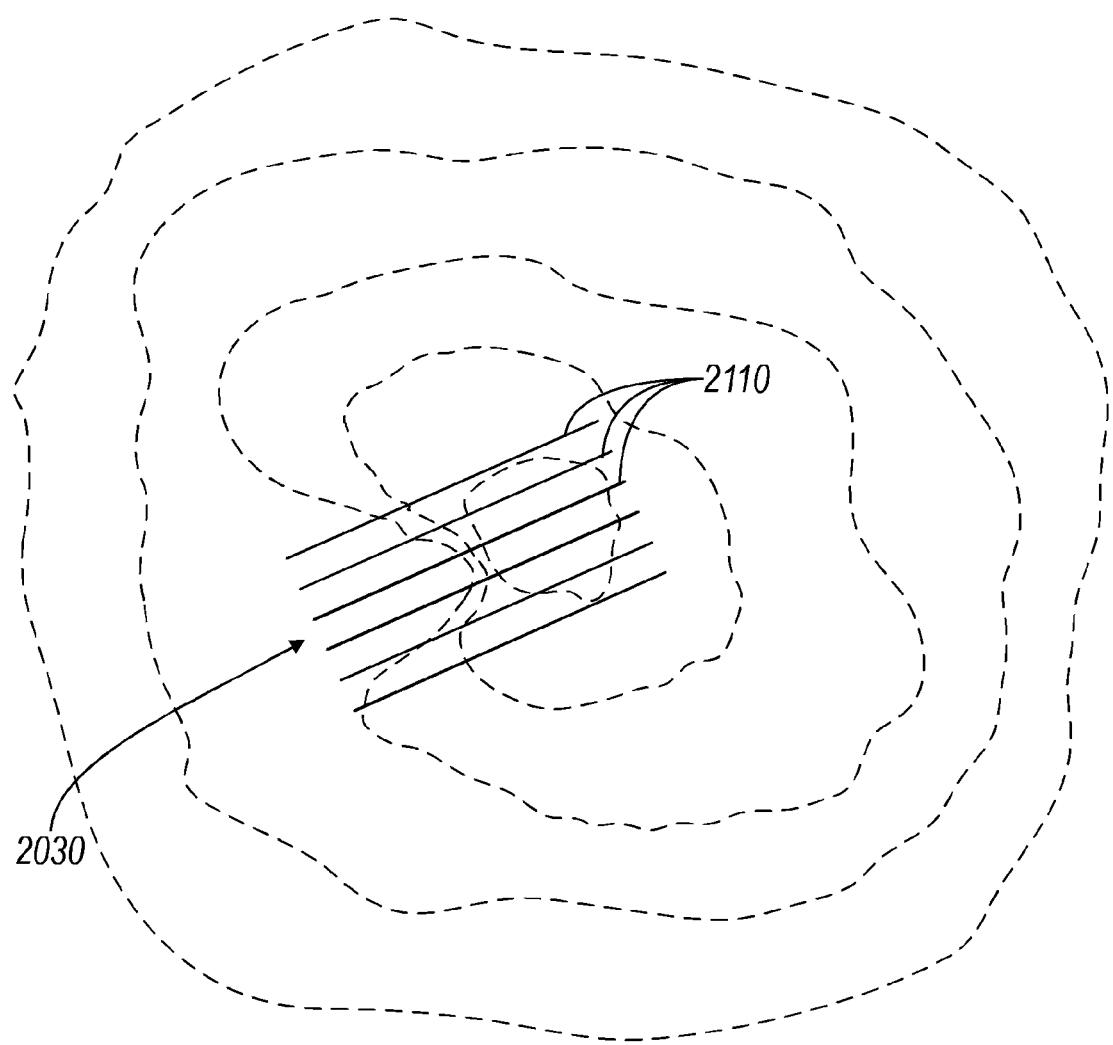
FIG. 21 is an image of laser lines generated in response to the fringe data of FIG. 20.

FIG. 21 illustrates a plurality of laser lines 2110 that are projected into the region 2030 using the adaptive light device. The laser lines 2110 may be located such that each line is generally perpendicular to the local fringe pattern in the region 2030 or in other implementations a series of parallel lines may be used as shown where the series of line is generally perpendicular to the fringes. In addition, a plurality of line orientations may be used in successive images, if additional resolution is required.

Again referring to FIG. 17, the system may utilize the field projection data, for example, from the moire fringe pattern analysis to identify the geometric features of the part as denoted by block 1722. The geometric features may include holes, slots, corners, edges, and various other geometric features of the part. The analysis to determine the geometric features may include moving a sphere or other sampling container through a three dimensional data cloud extracted from the field projection data and/or the adaptive light device data. The data in the sphere may be compared to a plurality of predefined templates to determine if the geometric feature corresponding to the template is identified on the surface.

In addition, the adaptive light device may be controlled to generate a structured pattern based on the identified geometric features of the surface 102, as denoted in block 1724. For example, a pattern of lines may be generated perpendicular to edges of a slot or perpendicular to an edge or corner formed in the part. These geometric features may be identified based on the area acquisition alone, or the area acquisition in addition to other acquisitions such as described with regard to block 1718 and 1720.

While the technique described with regard to block 1710 through 1724 may be adaptively executed for each part. Cycle time may be hindered by the complex analysis required and multiple images used in the process described above. As such the steps in 1710 through 1724 may be used as part of a teach mode of the system. As such an acquisition model may be generated as denoted by block 1726. The acquisition model may include the area acquisition and one or more of the adaptive light device acquisitions. For example, one or more of the acquisitions for gathering data in specular areas, gathering data in poor fringe contrast or resolution areas, and gathering data based on geometric features. Alternatively, the area acquisition may be used only for the teach mode while the adaptive light device acquisitions may be used only for the acquisition model to reduce cycle time during a run time environment. In this case, one or more of the adaptive light device acquisitions including the structured pattern based on geometric features may be utilized. In block 1728, the system may allow for manual adjustment of the acquisition model. The manual adjustment may allow the user to graphically add, remove, or modify lines or spots from the pattern projected by the adaptive light device. In block 1730, the system may store the acquisition model such that the acquisition model may be retrieved for run time execution. The method ends in block 1732. Further, it is understood that the system may store a plurality of acquisition models and a particular acquisition model may be triggered based on the part identifier that is sensed by the system. The part identifier may be received through a bar code or other sensing mechanism or provided to the system via a part tracking system that tracks a part through the entire manufacturing process.

In addition to or alternatively to the area projection system, the system may utilize the adaptive light device to scan the surface in point mode and utilize stereo cameras acting in sync to generate rough 3D surface of a scene. Using the coarse point cloud the controller may generate a 3D surface. The system may then switch the adaptive light device to line mode and capture the lines projected onto the surface. The system may calculate data points on the surface using triangulation methods. The 3D surface captured previously in point mode may be used to resolve any depth degeneracy when acquiring data using the lines.

The digitized scene may then be statistically analyzed to look for data quality improvements. This may take the form described above where a sphere or other volume is moved through the 3D cloud data. Various statistical information may be obtained for each position of the volume. The adaptive light device may be controlled to illuminate localized areas for high density data capture where data is sparse or where appropriate based on a template match for a particular geometry. This may be in the same manner as described above. For example, laser spots may be used for specular regions, laser lines may be used for low contrast or sloped regions. In addition, laser patterns may be generated based on the particular geometry identified, for example by template matching. In addition, a 3D registration algorithm may be applied to minimize non-overlap issues and a 3D surfacing algorithm may generate a 3D NURB surface from the point cloud generated in either scenario. The 3D NURB surface and/or the point cloud data may be exported to analysis or display software which may be supplied by a $3^{rd}$ party.

This device could be built with smaller standoff and hence sized for handheld market. Additionally, this device can use near IR, Red and Blue lasers with a fiber optic coupling pointing at the MEMS mirror unit to provide multiple models.

Further, this device can be used to a capture large scene without significant loss in resolution. The system described does not require retro-reflectors or photogrammetry targets to register 3D scene. Current camera and lens technology allow this device to auto-adjust focus and zoom to improve image quality. Modulation of the laser may allow optimized illumination of various parts, without external intervention.

Figure 22:
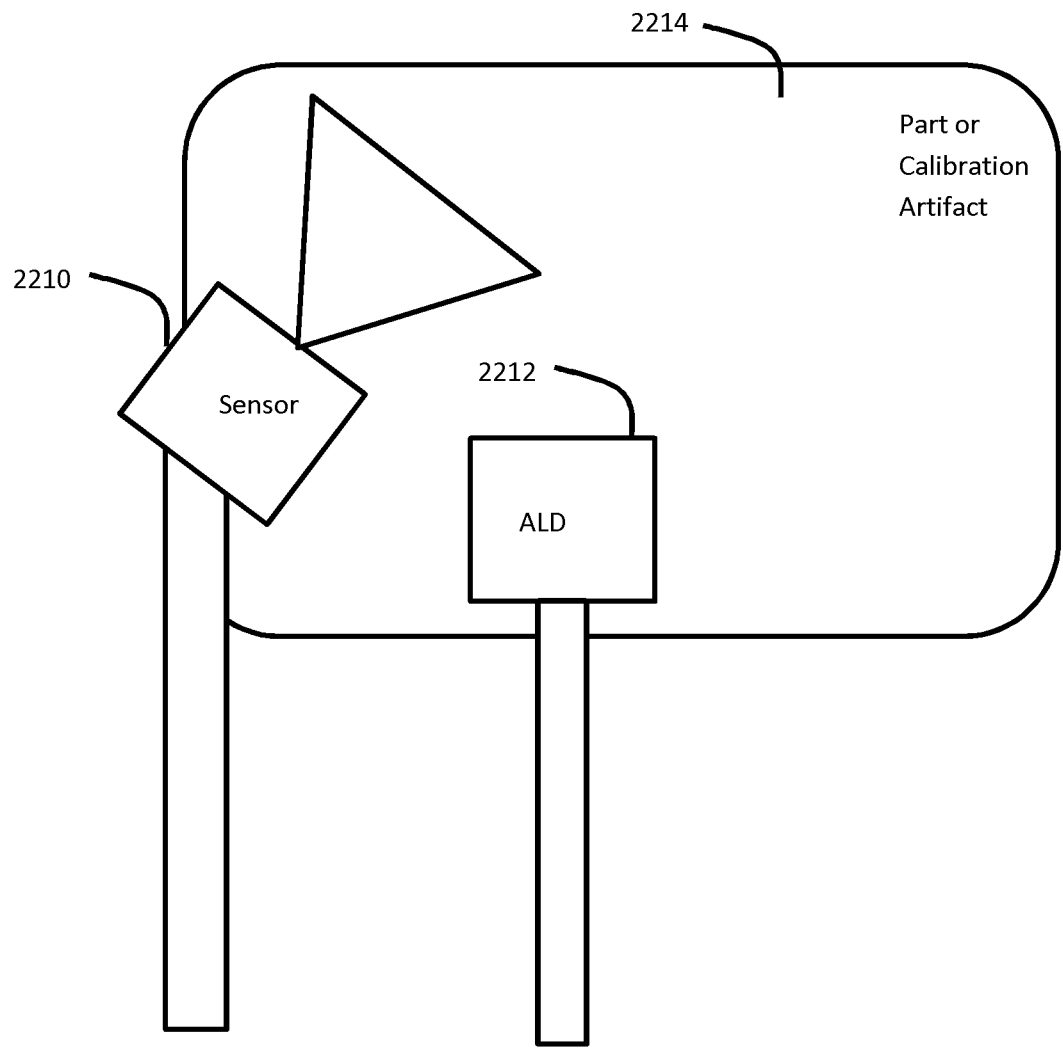
FIG. 22 is block diagram illustrating a sensor and a recalibrated adaptive light device.

In addition, as illustrated with respect to FIG. 22, the sensor may be mounted independently from the adaptive light device unit. In this scenario, one or more sensors 2210, for example as described above with respect to FIG. 16 may be provided for inspecting a part 2214. An adaptive light device 2212, as described above, may also be provided for inspecting the same part. The adaptive light device 2212 may be independently mounted from the one or more sensors 2210. The adaptive light device 2210 may also be factory calibrated to map the projection angles to the projection space in front of the adaptive light device 2210. The light from the adaptive light device may be projected onto the part 2214 and received by the one or more sensors 2210. However, the relationship between the adaptive light device 2212 and the one or more sensors 2210 would not be known due to the independent mounting of each device. Accordingly, the adaptive light device 2212 and the one or more sensors 2210 may be rectified and a transform may be determined between each of the one or more sensors 2210 and the adaptive light device 2212 by placing a known surface, such as a calibration artifact, within the projection field of the adaptive light device 2212 and the field of view of each of the one or more sensors 2210. The transform may be saved and utilized in production mode to measure the various parts to be inspected by the system. This can be particularly helpful if the adaptive light device is programmable and can control the projection within the adaptive light device projection space, since the processing system will be able to retrieve the projected position in the adaptive light device space and transform the light projection into sensor space to determine the location of the surface according to the viewed interactions with the surface in the sensor space.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

We claim:

1. A system for inspecting an article, the system comprising:
    at least one imager configured to receive an image with a field of view that includes the article;
    a field projection device configured to project an illumination field onto the article within field of view, wherein the illumination field is a moiré fringe pattern;
    an adaptive light device configured to project illumination structures onto the article within the field of view and onto an area upon which the moiré fringe pattern is projected;
    a processor configured to receive image data from the imager corresponding to the illumination field and the illumination structures, the processor being configured to analyze a feature of the article based on the illumination field and the illumination structures.

2. The system according to claim 1, wherein the adaptive light device is a laser source.

3. The system according to claim 2, wherein the illumination structures are programmable.

4. The system according to claim 1, wherein the adaptive light device is configured to project the illumination structures onto the article dynamically based on analysis of the illumination field.

5. The system according to claim 4, wherein the adaptive light device is configured to project the illumination structures in a location and orientation that is determined based on analysis of the moiré fringe pattern.

6. The system according to claim 4, wherein the adaptive light device is configured to generate a pattern of one or more lines to acquire data in regions where the data from analyzing the field projection is sparse.

7. The system according to claim 6, wherein the adaptive light device is configured to generate a pattern of one or more points to acquire data in regions where the data from analyzing the field projection determines that scatter of the illumination field is inhibiting analysis of the illumination field.

8. The system according to claim 1, wherein the processor is configured to determine a geometry on the article.

9. The system according to claim 1, wherein the geometry is identified based on an analysis of the illumination field.

10. The system according to claim 1, wherein the geometry is identified based on a plurality of predefined templates.

11. The system according to claim 1, wherein the adaptive light device is configured to project the structures onto the article based on the geometry.

12. The system according to claim 1, wherein the structures are analyzed to define a template for a feature of the article.

13. A method for inspecting an article, the method comprising the steps of:
imaging an article within a field of view;
projecting an illumination field onto the article within field of view, wherein the illumination field is a moiré fringe pattern;
selectively projecting illumination structures onto the article within the field of view and onto an area upon which the moiré fringe pattern is projected;
receiving image data corresponding to the illumination field and the illumination structures;
analyzing a feature of the article based on the illumination field and the illumination structures.

14. The method according to claim 13, further comprising determining, based on analysis of the moiré fringe pattern, a location to project the illumination structures.

15. The system according to claim 13, wherein the illumination field includes a moiré fringe pattern, and illumination structures are programmable laser illumination structures.

16. The system according to claim 13, further comprising projecting the illumination structures onto the article dynamically based on analysis of the illumination field.

17. The system according to claim 13, further comprising determining a geometry on the article based on an analysis of the illumination field and a plurality of predefined templates.

18. A system for inspecting an article, the system comprising:
a first imager and a second imager configured in a stereo pair, each of the first and second imager being configured to receive an image with a field of view that includes the article;
a field projection device configured to project an illumination field including a predetermined encoded laser pattern onto the article within field of view of both the first and second , wherein the illumination field includes a moiré fringe pattern;
an adaptive light device configured to project programmable laser illumination structures onto the article within the field of view of both the first and second imager and onto an area upon which the moiré fringe pattern is projected;
a processor configured to receive image data from the imager corresponding to the illumination field and the illumination structures, the processor being configured to analyze a feature of the article based on the illumination field and the illumination structures, the processor being configured to control the adaptive light device to project the illumination structures onto the article dynamically based on analysis of the illumination field.

19. The system according to claim 18, wherein the adaptive light device is configured to project the illumination structures in a location that is determined based on analysis of the moiré fringe pattern.

20. The system according to claim 18, wherein the processor is configured to determine a geometry on the article based on an analysis of the illumination field and a plurality of predefined templates.

21. The system according to claim 20, wherein the adaptive light device is configured to project the structures onto the article based on the geometry and the structures are analyzed to define a template for a feature of the article.

22. A system for inspecting an article, the system comprising:
at least one imager configured to receive an image with a field of view that includes the article;
a field projection device configured to project an illumination field onto the article within field of view;
an adaptive light device configured to project illumination structures onto the article within the field of view, wherein the adaptive light device is mounted independently from the at least one imager and is calibrated after mounting to determine a transform between the at least one imager space and the adaptive light device space;
a processor configured to receive image data from the imager corresponding to the illumination structures, the processor being configured to analyze a feature of the article based on the illumination structures and the transform.

* * * * *